US008499749B2

(12) United States Patent
Mosset et al.

(10) Patent No.: US 8,499,749 B2
(45) Date of Patent: Aug. 6, 2013

(54) AEROSOL SEPARATOR; COMPONENTS; AND, METHODS

(75) Inventors: Wade Stephen Mosset, Savage, MN (US); Robert Lawrence Dahlstrom, Cottage Grove, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 833 days.

(21) Appl. No.: 12/084,164

(22) PCT Filed: Oct. 27, 2006

(86) PCT No.: PCT/US2006/041738
§ 371 (c)(1),
(2), (4) Date: Oct. 6, 2009

(87) PCT Pub. No.: WO2007/053411
PCT Pub. Date: May 10, 2007

(65) Prior Publication Data
US 2010/0031940 A1    Feb. 11, 2010

Related U.S. Application Data

(60) Provisional application No. 60/731,287, filed on Oct. 28, 2005.

(51) Int. Cl.
*F02B 25/06* (2006.01)
(52) U.S. Cl.
USPC ......... 123/573; 123/572; 123/574; 123/41.86

(58) Field of Classification Search
USPC .............................. 123/572, 573, 574, 41.86
See application file for complete search history.

(56) References Cited

U.S. PATENT DOCUMENTS

| | | | | |
|---|---|---|---|---|
| 2,072,548 | A * | 3/1937 | Donaldson | 96/341 |
| 2,268,083 | A * | 12/1941 | Rapuano | 236/34 |
| 3,164,141 | A | 1/1965 | Jones | |
| 4,184,858 | A * | 1/1980 | Walker | 96/265 |
| 6,152,120 | A * | 11/2000 | Julazadeh | 123/572 |
| 6,647,973 | B1 * | 11/2003 | Schueler et al. | 123/572 |
| 6,907,869 | B2 * | 6/2005 | Burgess et al. | 123/572 |
| 7,309,372 | B2 * | 12/2007 | Kahlbaugh et al. | 55/527 |
| 2002/0033009 | A1 * | 3/2002 | Gieseke et al. | 55/332 |
| 2003/0051455 | A1 | 3/2003 | Gieseke et al. | |
| 2004/0139734 | A1 * | 7/2004 | Schmeichel et al. | 60/283 |
| 2005/0193694 | A1 * | 9/2005 | Gieseke et al. | 55/482 |
| 2005/0211232 | A1 * | 9/2005 | Dushek et al. | 123/574 |
| 2008/0035103 | A1 * | 2/2008 | Barris et al. | 123/198 E |

FOREIGN PATENT DOCUMENTS

| | | |
|---|---|---|
| CN | 2296402 Y | 3/1997 |
| GB | 2 033 247 | 5/1980 |
| WO | 99/00587 | 1/1999 |

* cited by examiner

*Primary Examiner* — Marguerite McMahon
*Assistant Examiner* — James Kim
(74) *Attorney, Agent, or Firm* — Merchant & Gould P.C.

(57) ABSTRACT

Arrangements for use in crankcase ventilation are described and shown. Included are serviceable crankcase ventilation filter cartridges which include a media pack axial drain arrangement, for preferred, efficient, operation. A crankcase ventilation filter arrangements including a housing and such a serviceable cartridge is shown. Also shown and described are methods of assembly, operation and use.

21 Claims, 19 Drawing Sheets

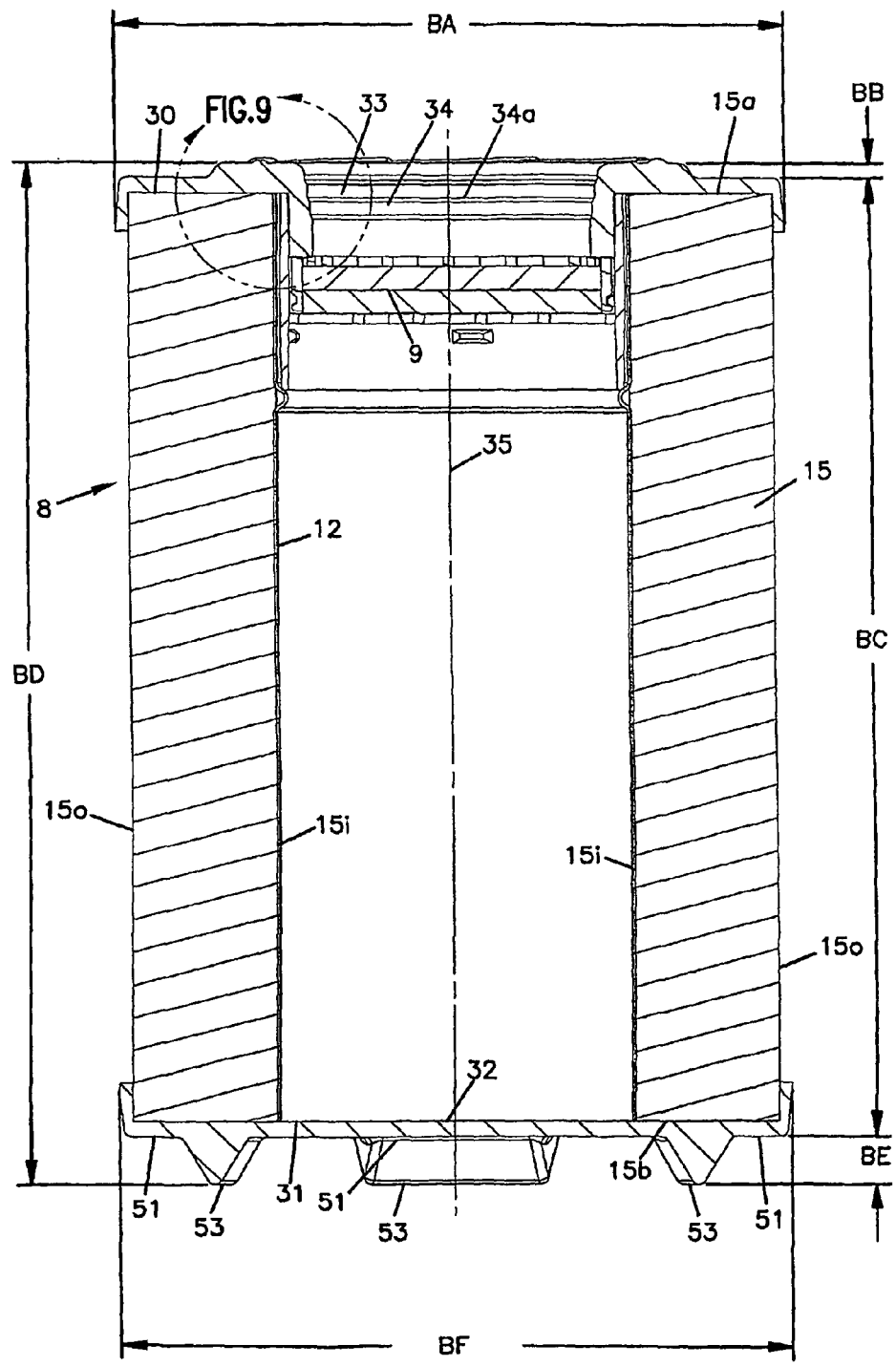

AEROSOL SEPARATOR; COMPONENTS; AND, METHODS

This application is being filed on 27 Oct. 2006, as a PCT International Patent application in the name of Donaldson Company, Inc., a U.S. national corporation, applicant for the designation of all countries except the US, and Wade Stephen Mosset and Robert Lawrence Dahlstrom, both citizens of the U.S., applicants for the designation of the US only, and claims priority to U.S. Provisional patent application Serial No. 60/73 1,287, filed Oct. 28, 2005.

CROSS REFERENCE TO RELATED APPLICATION

The present application includes, with edits and additions, the disclosure of U.S. provisional application Serial No. 60/73 1,287 filed on Oct. 28, 2005. The complete disclosure of U.S. provisional application Serial No. 60/731,287 is incorporated herein by reference. Also, a claim of entitlement to the priority of U.S. provisional application Serial No. 60/731,287 is made to extent appropriate.

TECHNICAL FIELD

This disclosure relates to systems and methods for separating hydrophobic fluids (such as oils) which are entrained as aerosols, from gas streams (for example crankcase gases). Preferred arrangements also provide for filtration of other fine contaminants, for example carbon material, from the gas streams. Methods for conducting the separations are also provided.

BACKGROUND

Certain gas streams, such as blow-by gases from the crankcase of diesel engines, carry substantial amounts of entrained oils therein, as aerosol. The majority of the oil droplets within the aerosol are generally within the size of 0.1-5.0 microns.

In addition, such gas streams also carry substantial amounts of fine contaminant, such as carbon contaminants. Such contaminants generally have an average particle size of about 0.5-3.0 microns. It is preferred to reduce the amount of such contaminants in these systems.

A variety of efforts have been directed to the above types of concerns. Examples are described in U.S. Pat. Nos. 5,853, 439; 6,171,355; 6,355,076; 6,540,801; 6,758,873; 6,143,049; 6,290,739; 6,852,148; and U.S. Publication 2005/0193694, each if which is incorporated herein by reference. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, in some instances without significant re-engineering; and, (d) serviceability; that is, development of systems which can be readily serviced after prolonged use.

SUMMARY OF THE DISCLOSURE

This disclosure particularly concerns development of techniques for use in crankcase ventilation (CCV) filters. According to the disclosure, filter assemblies, arrangements or constructions for preferred use to filter crankcase blow-by gases are provided. The constructions are particularly developed provide liquid drainage from coalescing media.

The terms "filter assembly", "filter arrangement", "filter construction" and variants thereof, as used herein, refer to both of: filter cartridges for use in filter assemblies; and, to overall filter assemblies for use with filter cartridges. A distinction between a filter cartridge standing alone, or used in a filter assembly, is not meant to be by made any of the terms "assembly", "construction" or "arrangement" unless other detail or description is provided.

Herein, a number of specific features and arrangements are described and shown. There is no requirement that an arrangement include all of the described features, to obtain some benefit of the principles described.

BRIEF DESCRIPTION OF THE DRAWINGS

FIG. 8 is a cross-sectional view of the filter cartridge taken along line 8-8, FIG. 7.

DETAILED DESCRIPTION

I. A Typical Application—Engine Crankcase (or Breather) Filter

Pressure-charged diesel engines often generate "blow-by" gases, i.e., a flow of air-fuel (gas-fuel) mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) contaminant from combustion, typically comprising carbon particles, a majority of which are about 0.1-10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol. The reference to the "hydrophobic" fluid, is not meant to suggest that there is never any water in the combustion gases. Rather is it meant that there is typically hydrophobic fluid, which raises issues of filtering.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2-50 cubic feet per minute (cfm), typically 5 to 10 cfm, are fairly common.

A typical system in which a crankcase ventilation filter arrangement according to the present invention would be utilized is as follows. Air is taken to the engine through a combustion air filter. The combustion air filter or cleaner cleans the air taken in for the combustion process. A turbo directs the filtered air into the engine. While in the engine, the air undergoes compression and with the fuel combustion occurs. During the combustion process, the engine gives off blow-by gases. A crankcase ventilation filter arrangement is in gas flow communication with engine and cleans the blow-by gases. From this filter arrangement, the air is either vented or is directed back into the engine, depending on whether the system is closed.

Figure 1:
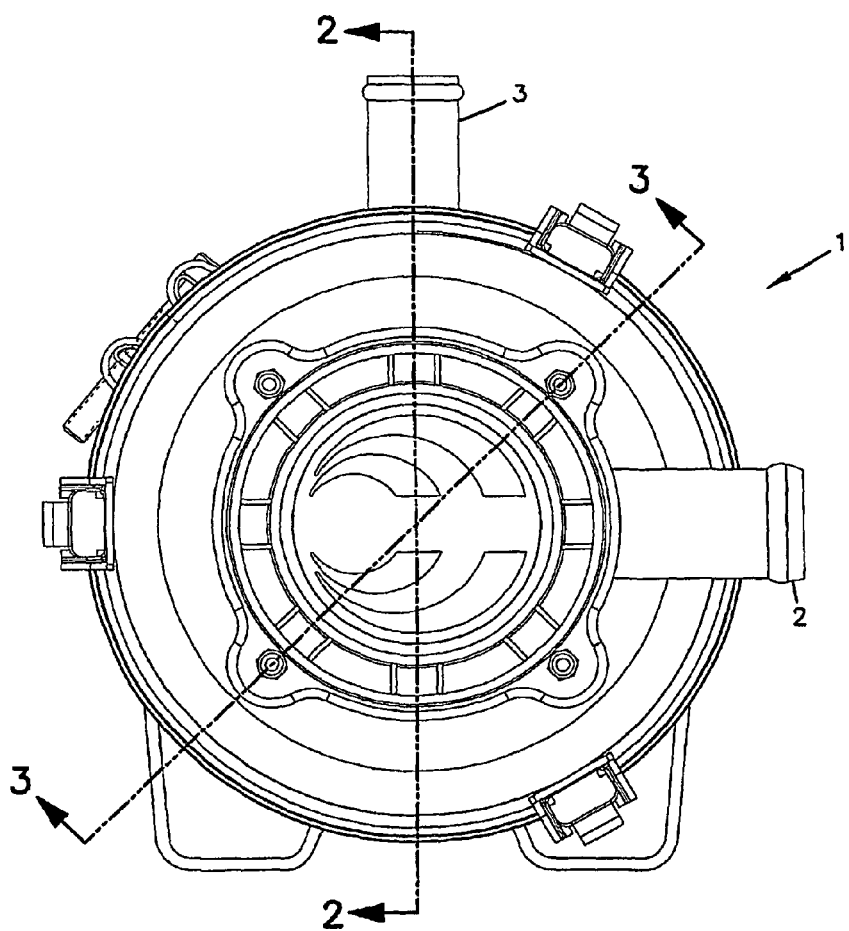
FIG. 1 is a top plan view of a crankcase ventilation filter assembly, constructed according to principles of this disclosure.
Figure 2:
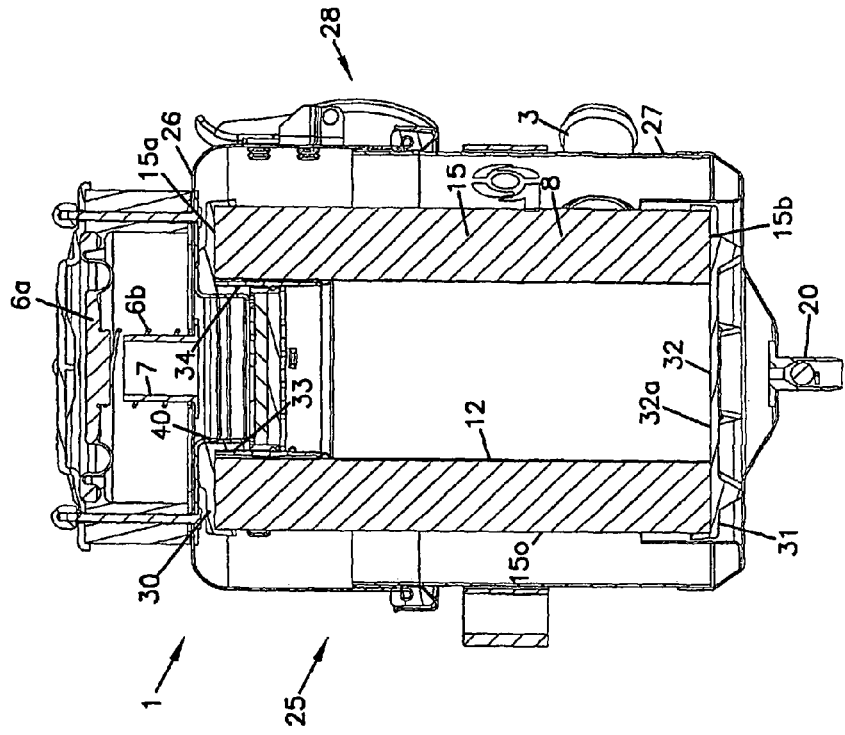
FIG. 2 is a cross-sectional view of the filter assembly depicted in FIG. 1, taken along line 2-2 thereof
Figure 3:
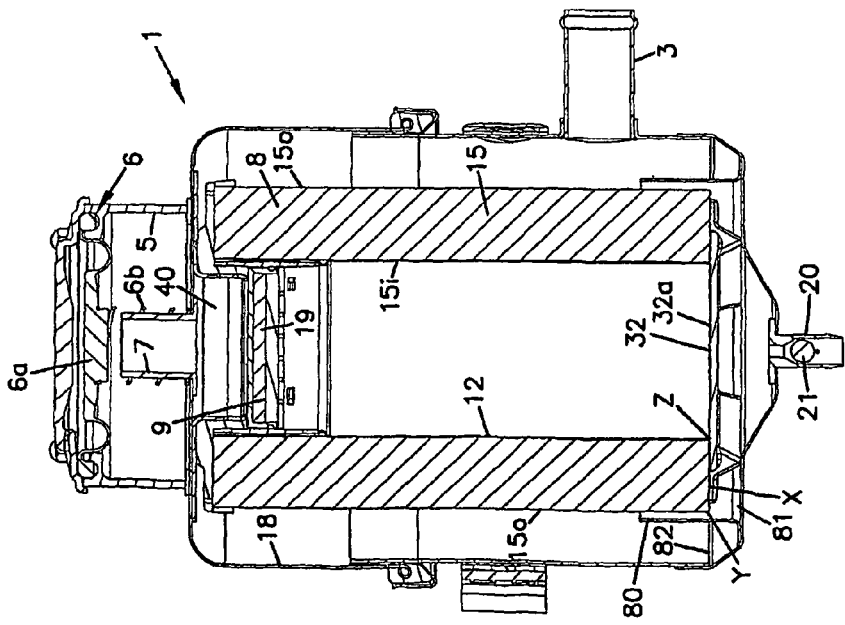
FIG. 3 is a cross-sectional view of the filter assembly depicted in FIGS. 1 and 2, and taken along the line 3-3 of Fig. 1.

According to this disclosure, a crankcase ventilation filter arrangement (and components thereof) for the blow by gases, i.e., for separating a hydrophobic liquid phase from a gaseous stream (sometimes referred to as a coalescer/separator arrangement) is provided. An example of such a crankcase ventilation (CCV) filter arrangement or assembly is depicted in FIGS. 1-3 at 1. 3 Referring to FIG. 1, a top plan view, crankcase gases (typically blow-by gases) to be filtered are directed into the filter arrangement 1 through inlet 2. In the filter arrangement 1, a filtration and separation step occurs. Filtered gases leave the arrangement 1 through outlet 3.

In FIG. 2, filter arrangement 1 is depicted in cross section. Crankcase blow-by gas flow entering arrangement 1 through inlet 2, FIG. 1, passes into housing interior region 5. From there, the gases, as controlled by regulator valve arrangement 6, enter into interior inlet 7. From the interior inlet 7 the gases are passed into a serviceable filter cartridge 8. The term "serviceable" with respect to the filter cartridge 8, is meant to refer to the fact that the cartridge 8 can be removed from, and be replaced in, the filter arrangement 1 periodically.

For the example arrangement shown, the gases are passed through an optional first stage coalescer 9 positioned in serviceable cartridge 8. After passage through optional first stage coalescer 9, the gases enter interior region 12 surrounded by (and defined by) a first extension of media 15. The gases pass through the media 15 into annular housing region 18, then outwardly from air filter arrangement 1 through outlet 3.

Still referring to FIGS. 2 and 3, for the example shown regulator valve assembly 6 comprises a diaphragm 6a controlled by a spring 6b, although alternatives are possible.

Referring to cartridge 8, FIGS. 2 and 3, the extension of media 15, again, surrounds and defines an open interior 12, and during filtering flow gases pass from interior 12 through the media 15 to annular region 18 surrounding the extension of media 15. This type of flow will be referred to herein as an "in-to-out filtering flow" or by variants thereof, in some instances. Arrangements that operate in the above-described general manner are known, and are described in U.S. Pat. No. 6,852,148, incorporated herein by reference.

It is noted that a typical filter arrangement 1 includes, in some instances, a bypass valve arrangement (not shown) to accommodate undesirable pressure increases or pulses within the assembly 1.

During operation of the filter arrangement 1, liquids are coalesced and separated by media within the cartridge 8, for the example shown, by media 19 within first filter 9 and by passage with in-to-out flow through first media extension 15. This liquid can drain, by gravity, to bottom drain 20 and outwardly from the assembly 1. If desired, a valve arrangement 21 can be provided, to ensure proper operation of the drain 20.

Referring to FIG. 3, for the example shown the filter arrangement 1 includes a housing 25 comprising separable cover 26 and base section 27. The cover 26 and base section 27 are secured together by latch arrangement 28. Access to service cartridge 8 is obtained by separating the cover 26 from the base 27, when latch arrangement 28 is disconnected. This allows for periodic servicing of the filter assembly 1, by removal of cartridge 8 for refurbishing or replacement. A typical service operation involves replacement of cartridge 8, for example at a defined service interval.

Referring still to FIG. 3, cartridge 8 is sealed by a housing seal within housing 25, to inhibit gas flow to secondary inlet 7 from by passing media within the cartridge 8, in passage toward outlet 3. A variety of housing seal arrangements are possible, depending on the specific features of the cartridge 8 and the housing 25. An example is described below.

The cartridge 8 comprises the first extension of media 15 having opposite media ends 15a and 15b. In the example shown, the first extension of media 15 has an inner surface 15*i* an outer surface 15*o* and, as described, surrounds and defines open interior 12.

For the example shown, the cartridge includes a first end cap 30. End cap 30 is positioned at media end 15*a*, which, in the example shown, is an upper end of media 15 when cartridge 8 is positioned for ordinary use. The end cap 30 is an open end, meaning that it surrounds and defines an aperture 33 in gas flow communication with cartridge interior 12.

The particular cartridge 8 depicted, also includes a second end cap 31 which in use is a lower end cap, positioned at end 15*b*, of the first extension of media 15. The end cap 31 depicted, includes features of a media overlap axial drain arrangement defined and discussed below.

As mentioned above, end cap 30 includes a housing seal thereon, for sealing the cartridge 8 against a housing component, to ensure air within region 5 cannot bypass media 15 to reach outlet 3. A variety of housing seal arrangements can be used. The particular housing seal arrangement 34 depicted is a radial seal arrangement, defining and surrounding aperture 33 and sized and configured to seal against an outer surface of a housing inlet flange 40. This type of radial seal arrangement is known for crankcase ventilation filters, as described in U.S. Pat. No. 6,852,148 incorporated herein by reference.

In the alternative, an axial seal arrangement could be used. An axial seal would typically comprise a gasket surrounding, and spaced from, aperture 33. This seal region or gasket would extend axially outwardly from media 15, to be pressed against housing components, in use, to form a seal.

Figure 4:
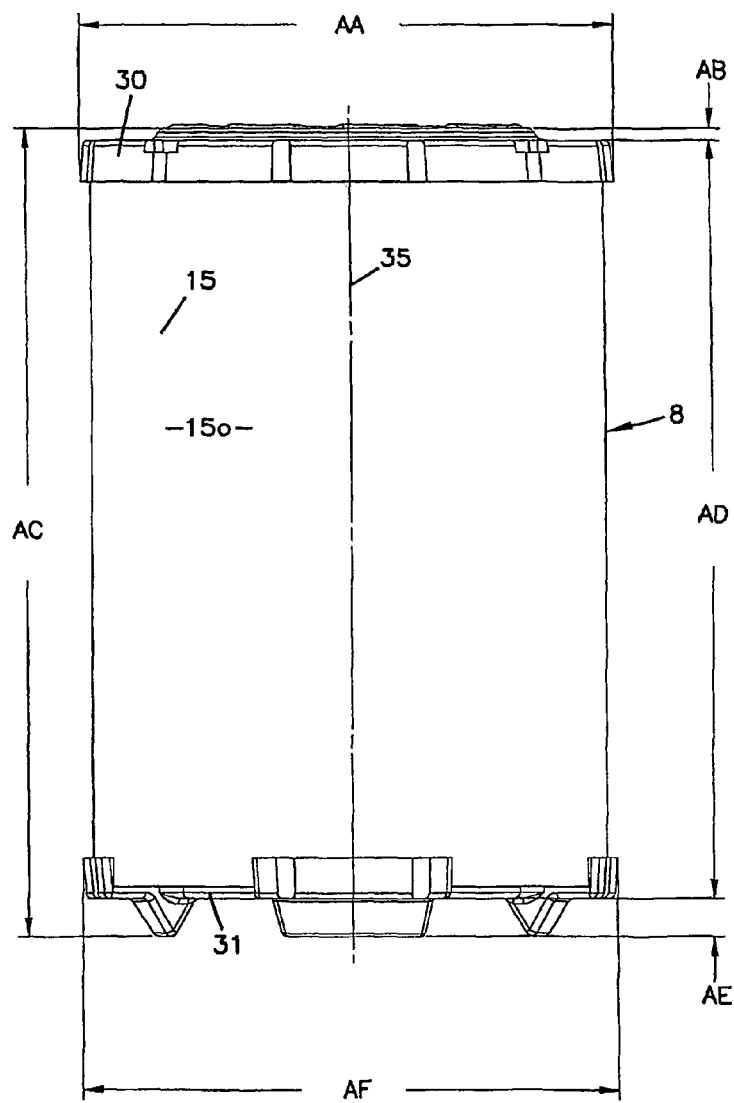
FIG. 4 is an enlarged side elevational view of a serviceable filter cartridge useable in the assembly of FIGS. 1-3.

Herein, the term "axial" is typically used to refer to a general direction corresponding to a filter cartridge central axis 35, FIG. 4, and the term "radial" is generally used to refer to a direction of extension generally perpendicular to axis 35.

Attention is now directed to FIG. 4, in which cartridge 8 is depicted in side elevational view. First media extension 15, top end cap 30 and bottom end cap 31 are viewable.

Figure 5:
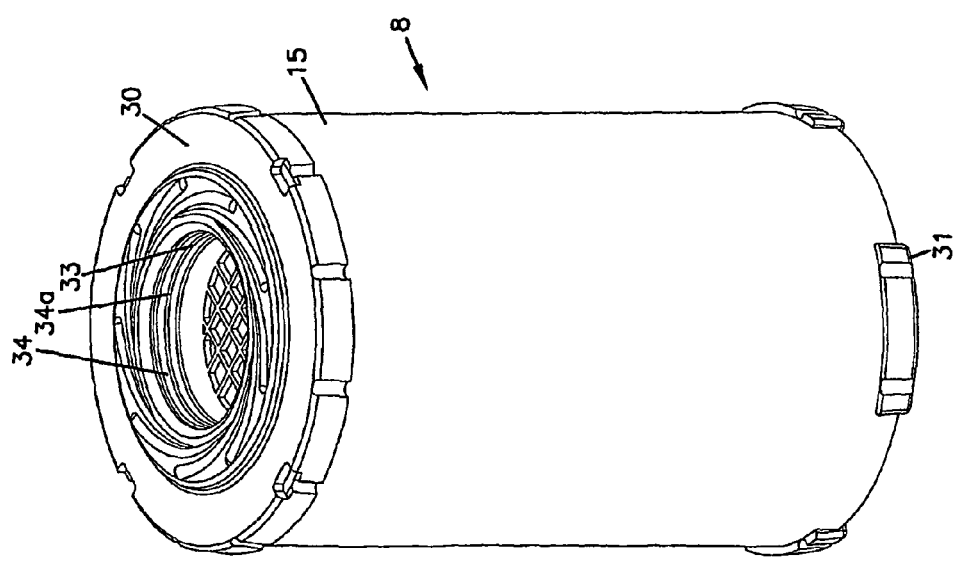
FIG. 5 is a top perspective view of the filter cartridge of FIG. 4.

Referring to Fig. 5, a top perspective view of cartridge 8 is shown, and end cap 30 is viewable. Seal region 34, in the form of a radial seal 34*a*, defining aperture 33 is viewable. In use, radial seal 34*a* would compress when pushed over (i.e., around) a flow tube 40, in use (FIGS. 2 and 3), to provide a housing seal.

It is noted that in reference to the figures, the term "top" is used to indicate a portion of a feature described, with respect to its typical orientation during use, relative to other, related portions. The term "bottom" is oppositely used.

Herein above, it was stated that the arrangement 1 includes a media overlap axial drain arrangement. The term "media overlap axial drain arrangement" is meant to refer to an arrangement which permits at least some drainage of liquid from media 15 directly out through media bottom end 15*b*, in overlap with the media 15. That is, media overlap axial drainage is axial drainage for the extension of media 15 that does not require all of the liquid to flow out of a media side surface 15*i*, 15*o*, FIG. 8, to drain. Example structure of a media overlap axial drain arrangement, is included in end cap 31. (Of course, some liquid can drain out of media surface 15*o*, in typical applications).

Figure 6:
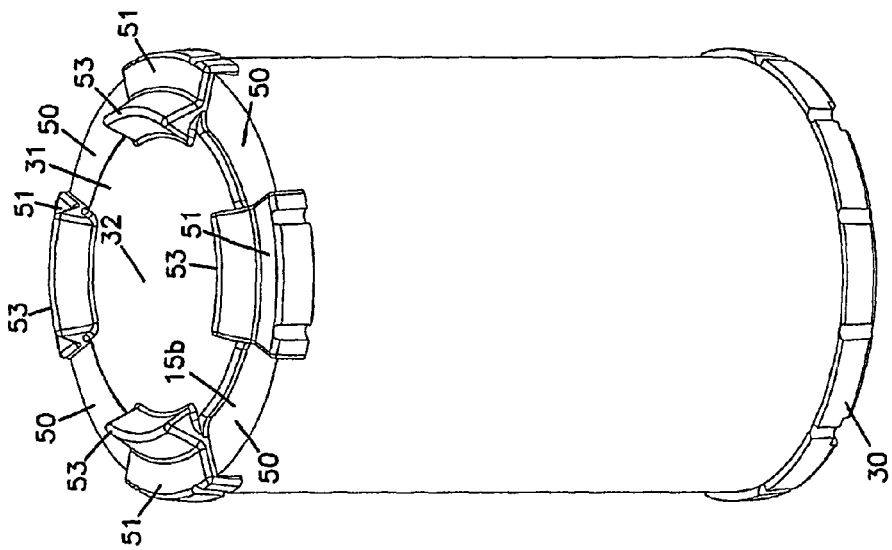
FIG. 6 is a bottom perspective view of the filter cartridge according to 4 and 5.

In FIG. 6, cartridge 8 is depicted inverted, relative to the view of FIG. 5. Here, second or bottom end cap 31 is viewable.

Figure 7:
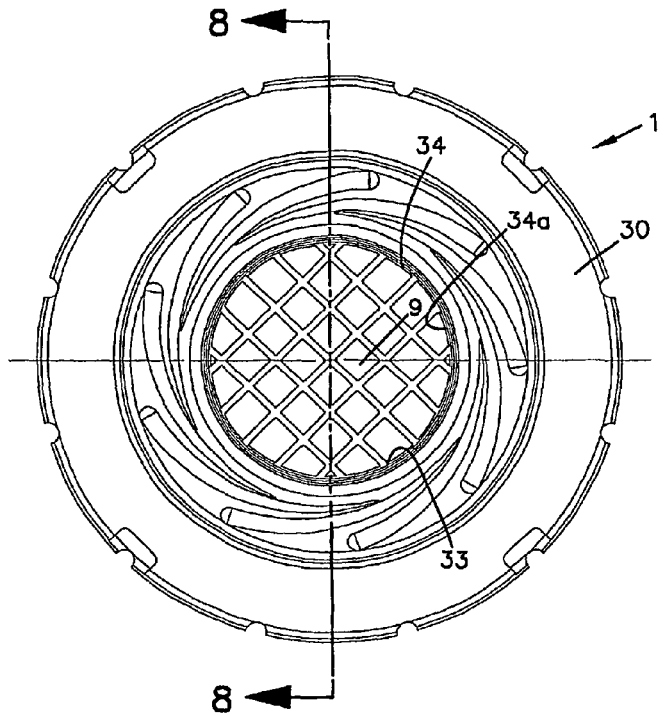
FIG. 7 is a top plan view of a filter cartridge according to FIGS. 4-6.

In FIG. 7, a top plan view of cartridge 8 is shown. In FIG. 7, end cap 30 is viewable.

In FIG. 8, a cross-sectional view of cartridge 8 is provided. The first extension of media 15 can be seen as surrounding a central region 12 and having opposite ends 15*a* and 15*b*, with end 15*a* being embedded within end cap 30. That is, at least a portion of liquid collected within media 15 can coalesce within the media 15, arid then drain axially outwardly through open end regions 50 in media end 15*b*.

In the example shown, end 15*b* is partially embedded within end cap 31. This will be understood by reference to FIG. 6. Referring to FIG. 6, media end 15*b* is depicted with at least selected portions 50 not embedded within end cap 31. For the example shown other portions of media end 15*b* are axially covered by (and in the example shown, are embedded within) spaced regions or sections 51 of end cap 31.

Referring to FIG. 5, this allows some drainage of liquid directly, axially, outwardly from media 15 through open regions 50. By the term "directly" reference is meant to a drainage that does not require the portion of liquid that undergoes the described axial drainage flow to drain outwardly through one of the media sides, i.e., one of the sides 15*i*, 15*o*. Advantages from this are discussed below.

Referring again to FIG. 8, it is noted that end cap 31 includes closed central region 32. Central region 32 extends radially across the media open interior 12, at end 15*b*, closing interior 12 adjacent end 15*b* to passage of flow from interior 12 through end cap 31, without passage at least partly into the first extension of media 15.

The example end cap 31 shown has sections 51 that extend from media inner surface 15*i* to media outer surface 15*o*, FIG. 8, i.e., a location outside of the media perimeter. Sections 51 include axial outward projections 53, which operate as cushions to help properly position the cartridge 8 within a housing 25, during use, as shown in FIGS. 2 and 3.

Figure 10:
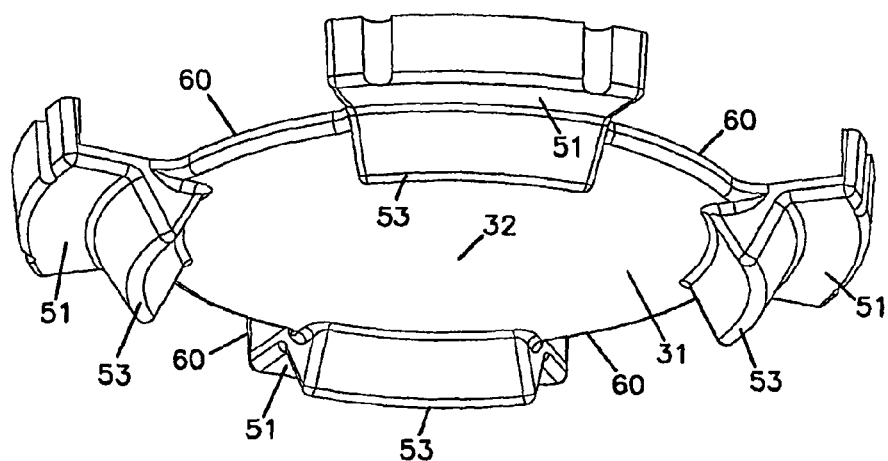
FIG. 10 is a bottom perspective view of a bottom end cap useable in the filter cartridge of FIGS. 4-9.

In FIG. 10, a bottom perspective view of end cap 31 is viewable, with central closed region 32, and spaced regions 51 for engagement with, and overlap with, portions of bottom end 15*b* of the first extension of media 15, FIGS. 5, 6 and 8. End cap 31 defines spaced, bottom, drain regions 60 therein, between regions 51 which will overlap with portions of the bottom end 15*b* of media 15, FIG. 8, to allow at least some drainage axially directly, downwardly, from the media 15 through regions 50, FIG. 6, during operation.

Figure 12:
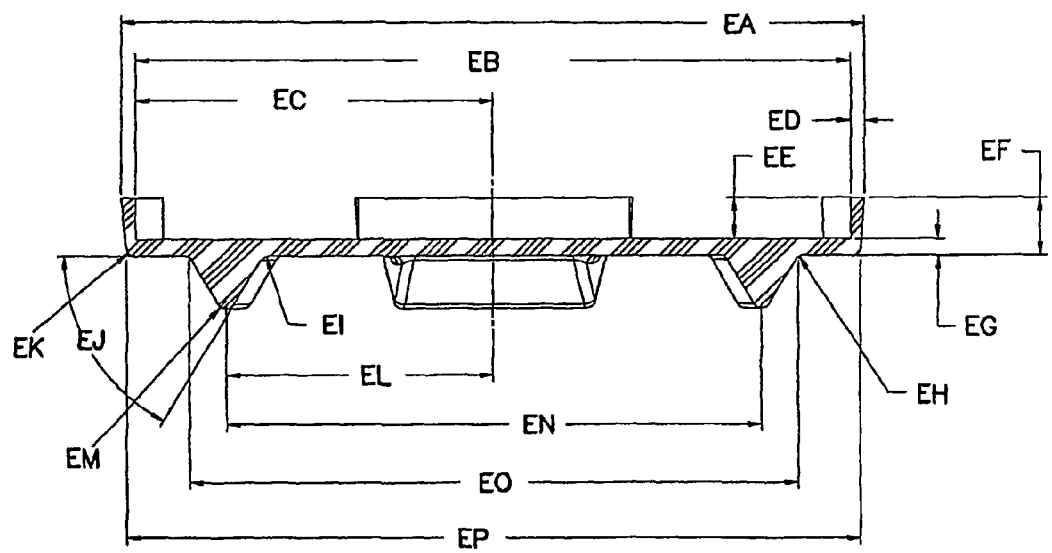
FIG. 12 is a cross-sectional view of the end cap depicted in Fig. 11; the cross sectional view of FIG. 12 being taken along line 12-12, FIG. 11 with FIG. 12 being oriented with a bottom face, as in use, directed down.
Figure 13:
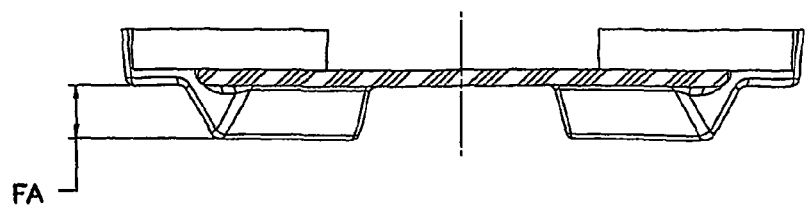
FIG. 13 is a cross-sectional view taken along line 13-13, FIG. 11 and with the end cap of FIG. 13 oriented with a bottom face directed down, as normal for use.

In FIG. 11*a*, bottom plan view of end cap 31 is provided. In FIGS. 12 and 13, selected cross sectional views as defined, are provided.

Attention is now directed back to FIGS. 2 and 3. In general operation, cartridge 8 is positioned within a filter arrangement 1, as a crankcase ventilation 5 (CCV) filter. Gases from a crankcase pass into cartridge interior 12 and then through media pack 15, during operation. Within media pack 15 several operations occur. One of these operations is particulate filtering. Another operation is coalescing of liquid entrained within the gases. At least a portion of the coalesced liquid can drain axially directly out of media 15, directly through regions 50, FIG. 6. The term "axially" in this context, it is meant to characterize a drainage direction along the general direction of a central axis 35 for the cartridge 8. When it is said that the drainage is axial it is not meant that the direction is precisely parallel to the central axis 35 of the cartridge 8, but rather that the drainage is directly out of end 15*b*. It is noted that in operation some additional non-axial drainage may also occur at outside surface 15*o*, and downwardly between projections 53, to drain 20. This latter would not be "direct, axial" drain flow from end 15*b*, but would also be found in many example applications of the principles described herein.

With cartridge 8 oriented as shown in FIGS. 2 and 3, with end cap 31 directed downwardly, a liquid head (equilibrium level) will build within first extension media 15, above end cap 31, in use. At least a portion of the liquid can drain, for efficient operation, axially, downwardly, directly out of end 15*b* of the media, due to the media overlap axial drain arrangement, for example through drain openings 60, FIG. 10, defined by end cap 31. The liquid can then flow to drain 20.

An advantage results from the media overlap axial drain arrangement. In particular, liquid can begin to drain from media 15, with lower liquid head, when the media overlap axial drain arrangement is present. This means that a given length of media 15 between ends 15a, 15b, can be used more efficiently and with less buildup of undesirable pressure differential thereacross, in use. The relatively high liquid drain rate also helps clear media 15 of entrained material.

Operation of cartridge 8, then, is facilitated by utilizing for media 15, good coalescing media for entrained liquid in gases that reach region 12. Examples of coalescing media utilizable for this, are described herein below, in Section IV. The media used for the first extension media 15, will typically be a fibrous media that fills (except for air pores) the volume between outside surface 15o and inside surface 15i. In the example shown herein, the media 15 defines a generally cylindrical media region, with a generally cylindrical outer surface 15o and a generally cylindrical inner surface 15i, although alternate configurations are possible. An example of a manner in which to accomplish such a media definition, is through coiling a media wrap around an inner liner. In the alternative, individual, separate, wraps can be made and be positioned overlapping one another.

In general terms, the media 15 can be described as defining, at end 15b, an end area X. When the media 15 is cylindrical, the end area X would 10 generally have an area X corresponding to a ring defined by a circle at outer perimeter Y and a circle at inner perimeter Z. The area X, of course, would be the area of a circle defined by outer perimeter Y minus the area of a circle defined by inner perimeter Z.

Typically, adjacent end 50b of the media 15, the cartridge end cap 31 includes openings 60 corresponding to overlap with at least 20% of the surface area X defined by bottom 15b, usually at least 30% of X, and often at least 40% of X. For the example shown about 50% of the area X defined by bottom end 15b is open to direct axial drain from the media 15, although alternatives are possible. In this context, the term "direct" would refer to axial drainage, is meant to refer to a drainage from the first media extension 15 along bottom end 15b which is not first exit inner surface 15i or outer surface 15o.

Generally, a maximum amount of drain area possible, without undesirable loss of integrity to the overall cartridge construction, is useful. As a result, in a typical system no more than 80% of the area defined by bottom end 15b will be open or exposed for direct drainage, in a typical arrangement. However, when structural needs for the cartridge are met, 100% of the media bottom can be open for drainage.

Typically, end caps 30 and 31 are molded-in-place end caps. Typically a material such as polyurethane, for example polyurethane foam, can be used. An example polyurethane foam is described herein below in Section II.

Referring to FIGS. 2 and 3, it is noted that housing bottom 27 includes an internal, circular, shield 80 thereon, projecting upwardly from housing bottom 81, and surrounding and spaced from cartridge 8. In general, the shield 80 helps with centering the cartridge 8. The shield 80 also helps block liquid flow in region 81 from entering into region 82, i.e., annular region 18. Typically the shield 80 will extend an axial length, along the outside of cartridge 8 a length of about 30 mm-60 mm, although alternatives are possible. Some assemblies 1 can be constructed with no shield.

Still referring to FIGS. 2 and 3, as indicated above, the particular cartridge 8 depicted includes an optional first stage coalescer 9. Cartridge 8 is configured so that as gases pass into region 12, through end cap 30, they pass through the first stage coalescer 9. The first stage coalescer 9 can be generally as described for similar coalescers in U.S. Pat. No. 6,852,148, incorporated herein by reference. Again, first stage coalescer 9 is optional, arid its use, in part, turns upon the level of efficiency desired in accomplishing separation of liquid, as well as the volume available for the assembly 1, within an engine system.

At least a portion of liquid coalesced by media 19 within optional first stage coalescer 9, will drain down to end cap 31, and then from media 15 through regions 60 in end cap 31. If desired, region 32 can be provided with an upper surface 32a, FIGS. 2 and 3, configured with a raised central portion (not shown) to facilitate liquid flow into media 15.

Figure 14:
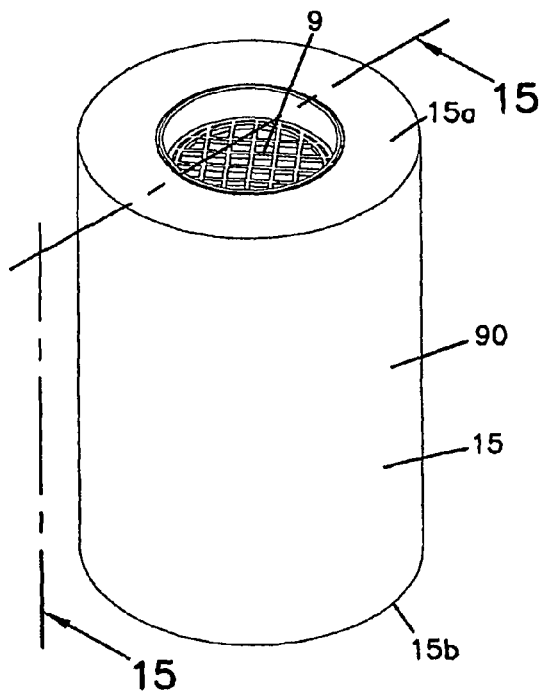
FIG. 14 is a perspective view of a media pack useable in a filter cartridge of FIGS. 4-7.
Figure 15:
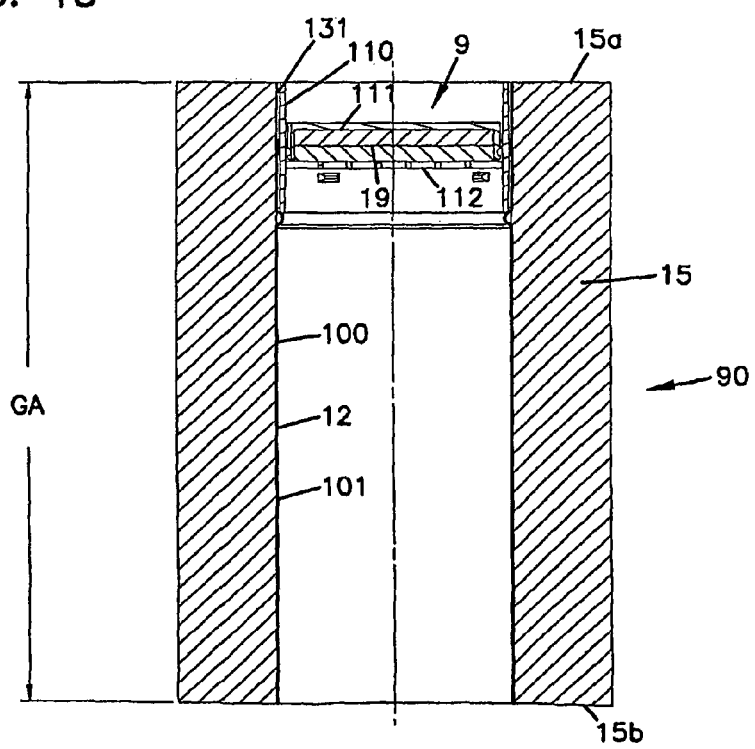
FIG. 15 is a cross sectional view of the media pack depicted in FIG. 14; the view of FIG. 15 being taken along line 15-15, FIG. 14.

Attention is directed to FIG. 14, in which a media pack 90, comprising 20 first extension of media 15 surrounding optional first stage coalescer 9 is depicted. In FIG. 15, media pack 90 is depicted in cross-section. In a typical process for making a cartridge 8, media pack 90 would be assembled, and then the end caps 30, 31, would be molded-in-place.

Referring to FIG. 15, first extension of media 15 is positioned surrounding an internal liner 100. The internal liner would typically have a porous region 101. The optional first stage coalescer 9 is positioned within the media pack 90, adjacent an end which will define media end 15a, in use. The first stage coalescer 9 comprises a framework 110 having media 19 positioned therein. The framework 110 includes an upper grid 111 and a lower grid 112.

Figure 16:
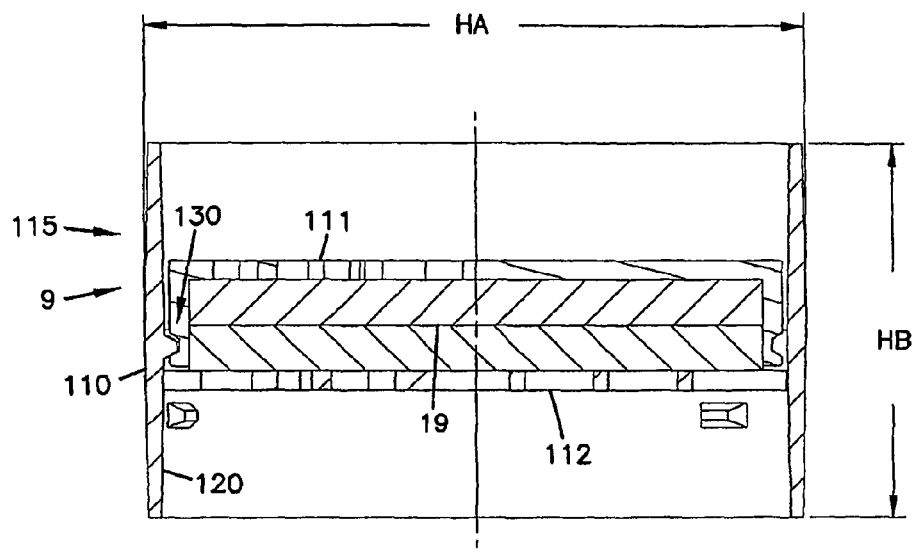
FIG. 16 is an enlarged cross-sectional view of a filter component useable in the media pack of FIG. 15.

In FIG. 16, a subassembly 115 comprising the coalescer filter 9 is viewable.

Figure 17:
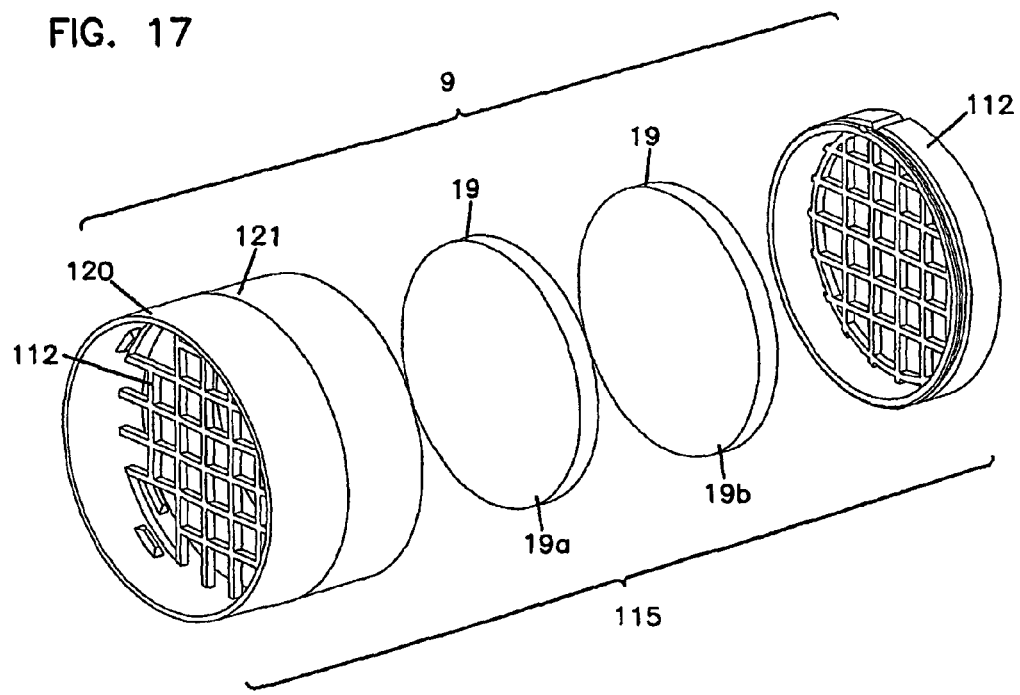
FIG. 17 is an exploded perspective view of the filter component of FIG. 16.

In FIG. 17, the coalescer filter 9 is depicted in exploded view, indicating assembly. The coalescer 9 includes a base 120 having lower grid 112 and a sidewall 121. Media 19 is positioned within the base 120, surrounded by sidewall 121 and against grid 113. Grid 112 can then be snapped in place surrounded by sidewall 121, to form the subassembly 9. In FIG. 16, an interference or snap fit connection between grid 112 and sidewall 121 is shown at 130. For the example shown in FIG. 16 and 17, the media 19 is provided in two pads 19a, 19b, although alternatives are possible.

Figure 18:
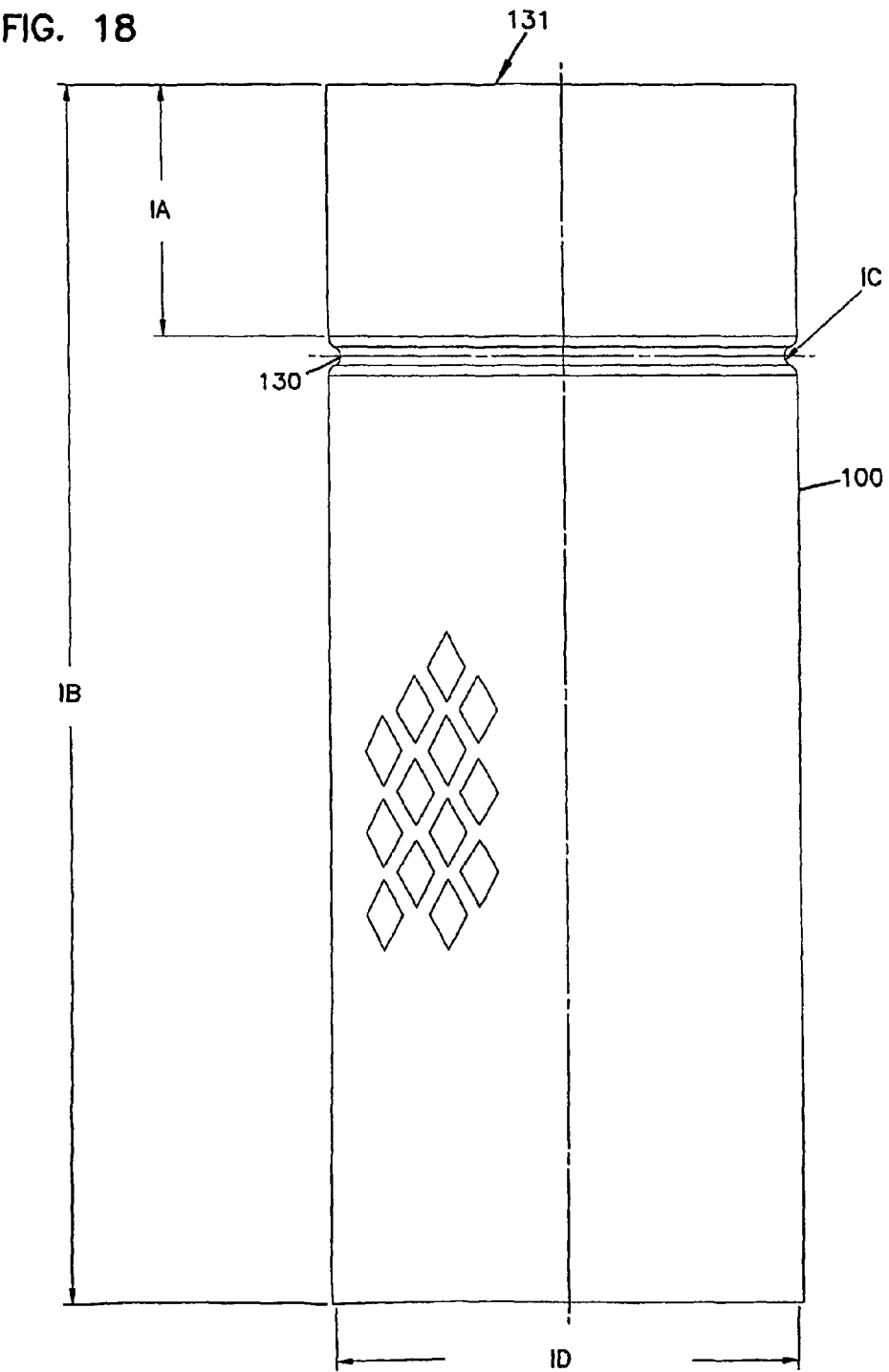
FIG. 18 is a side elevational view of an inner liner component of the media pack of FIG. 14.

To assemble media pack 90, the subassembly 115 would be positioned within liner 100. Referring to FIG. 18, the liner 100 is provided with an inner bead or shelf at 130. Subassembly 9 can be positioned within region 131 of liner 100, with sidewall 121 positioned on bead or shelf 130, to be secured in place when end cap 30 is molded in place.

The principles of construction previously described, can be applied in a variety of sizes and shapes of arrangements. An example is shown. The following dimensions provide an example, to understand application of the principles of the present disclosure.

Referring to FIG. 4: AA=129.4 mm; AB=3 mm; AC=203.6 mm; AD=191 mm; AE=9.6 mm; AF=129.4 mm.

Referring to FIG. 8: BA=129.4 mm; BB=3.0 mm; BC=191 mm; BD=203.6 mm; BE=9.6 mm; BF=129.4 mm.

Figure 9:
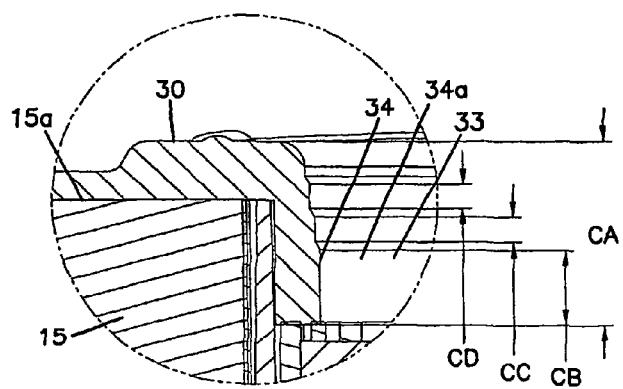
FIG. 9 is an enlarged fragmentary view of a portion of FIG. 8.

Referring to FIG. 9: CA=18.68 mm; CB=7.58 mm; CC=2.5 mm; CD=2.5 mm.

Figure 11:
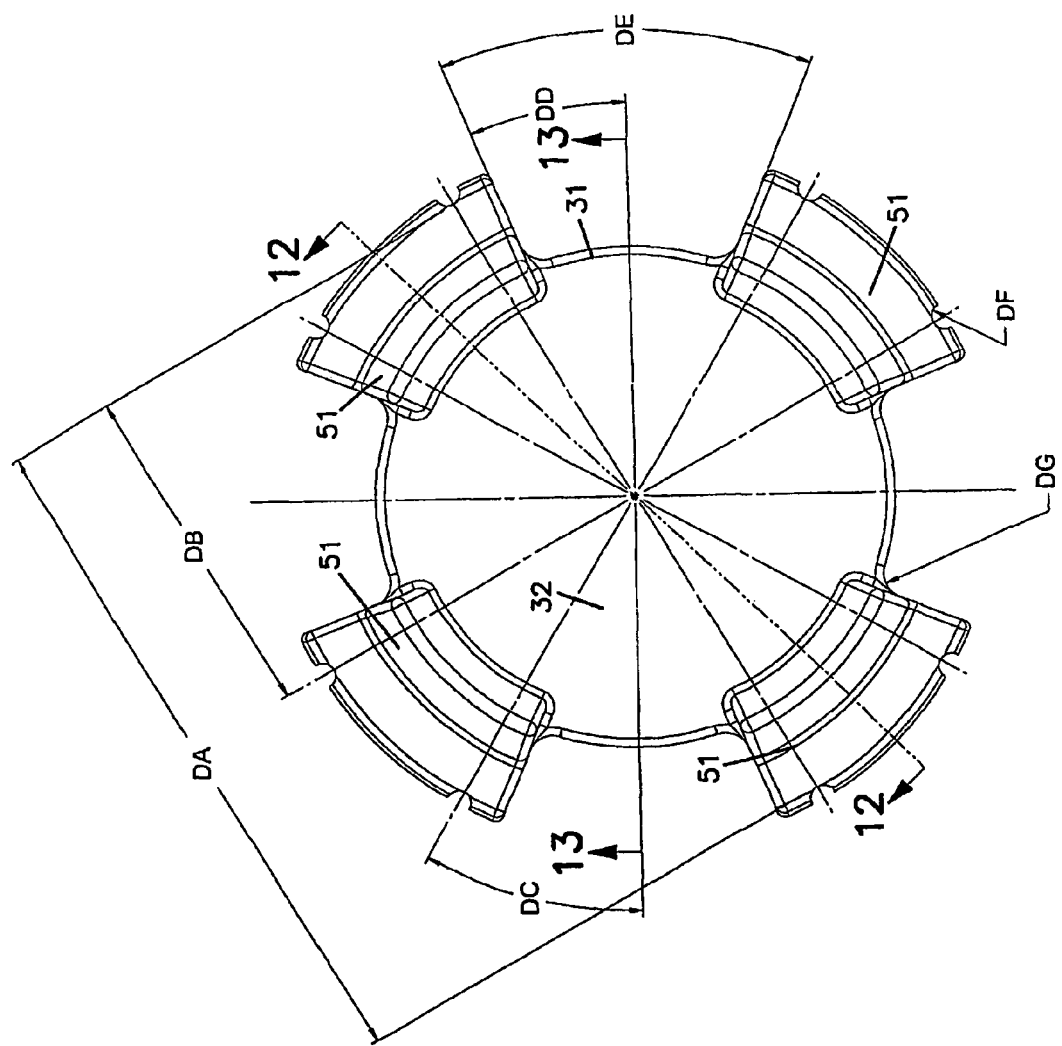
FIG. 11 is a bottom plan view of the end cap depicted in FIG. 10.

Referring to FIG. 11: DA=124.5 mm; DB=62.3 mm; DC=30°; DD=22°; DE=45°; DF=2.3 mm radius; DG=4.5 mm radius.

Referring to FIG. 12: EA=129.4 mm; EB=124.4 mm; EC=62.2 mm; ED=2.5 mm; EE=7.4 mm; EF=10.4 mm; EG=3.0 mm; EH=1.5 mm radius; EI=1.5 mm radius; EJ=60°; EK=1.5 mm radius; EL=46.7 mm; EN=93.4 mm; EO=106.2 mm; EP=127.8 mm.

Referring to FIG. 13: FA=9.6 mm.
Referring to FIG. 15: GA=185 mm.
Referring to FIG. 16: HA=67 mm; RB=39.2 mm.
Referring to FIG. 18: IA=37.9 mm; IB=185 mm; IC=1.96 mm deep bead; ID=67.8 mm.

From these figures an example arrangement will be understood. Of course alternative dimensions and shapes can be utilized in arrangements involving principles according to the present disclosure. The dimensions were developed for a filter cartridge according to the present drawings sized and shaped to replace a previous style cartridge in an assembly for bypass flow therethrough of about 110-300 liters/minute. Such flows are typical for 8-12 liter engines as found on Class 7 or 8 trucks.

II. End Cap Materials

As mentioned previously, in some instances end caps 30, 31 will be molded in place end caps. When such is the case, a variety of materials can be used for the end caps, an example being urethane. In typical arrangements, polyurethane foam will be used to provide a relatively soft arrangement convenient for defining radial seal 34 and also for junctions or bumps 53.

Preferably the formula chosen will be such as to provide end caps (parts molded from the polyurethane) having an as molded density of no greater than 28 lbs./cubic foot (about 450 kilograms/cubic meter), more preferably no more than 22 lbs./cubic foot (355 kilograms/cubic meter), typically no greater than 18 lbs/cubic foot (290 kilograms/cubic meter) and usually within the range of 12 to 17 lbs/cubic foot (192-275 kilograms/cubic meter). Lower densities can be used, if the material is formulated such that it can be controlled for proper molding and rise.

Herein the term "as molded density" is meant to refer to its normal definition of weight divided by volume. A water displacement test or similar test can be utilized to determine volume of a sample of the molded foam. It is not necessary when applying the volume test, to pursue water absorption into the pores of the porous material, and to displace the air the pores represent. Thus, the water volume displacement test used, to determine sample volume, would be an immediate displacement, without waiting for a long period to displace air within the material pores. Alternately stated, only the volume represented by the outer perimeter of the sample need be used for the as molded density calculation.

In general, compression load deflection is a physical characteristic that indicates firmness, i.e. resistance to compression. In general, it is measured in terms of the amount of pressure required to deflect a given sample of 25% of its thickness. Compression load deflection tests can be conducted in accord with ASTM 3574, incorporated herein by reference. In general, compression load deflection may be evaluated in connection with aged samples. A typical technique is to measure the compression load deflection on samples that have been fully cured for 72 hours at 75° F. or forced cured at 190° F. for 5 hours.

Preferred materials will be ones which when molded, show a compression load deflection, in accord with ASTM 3574, on a sample measured after heat aging at 158° F. for seven days, on average, of 14 psi or less, typically within the range of 6-14 psi, and often within the range of 7-10 psi.

Compression set is an evaluation of the extent to which a sample of the material (that is subjected to compression of the defined type and under defined conditions), returns to its previous thickness or height when the compression forces are removed. Conditions for evaluating compression set on urethane materials are also provided in ASTM 3574.

Typical desirable materials will be ones which, upon cure, provide a material that has a compression set of no more than about 18%, and typically about 8-13%, when measured on a sample compressed to 50% of its height and held at that compression at a temperature of 180° F. for 22 hours.

In general, the compression load deflection and compression set characteristics can be measured on sample plugs prepared from the same resin as used to form the end cap, or on sample cut from the end cap. Typically, industrial processing methods will involve regularly making test sample plugs made from the resin material, rather than direct testing on portions cut from molded end caps.

Urethane resin systems useable to provide materials having physical properties within the as molded density, compression set and compression load deflection definition as provided above, can be readily obtained from a variety of polyurethane resin formulators, including such suppliers as BASF Corp., Wyandotte MI, 48192.

One example usable material includes the following polyurethane, processed to an end product having an "as molded" density of 14-22 pounds per cubic foot (224-353 kilograms/cubic meter). The polyurethane comprises a material made with I36070R resin and I305OU isocyanate, which are sold exclusively to the assignee Donaldson by BASF Corporation, Wyandotte, Michigan 48192.

The materials would typically be mixed in a mix ratio of 100 parts I36070R resin to 45.5 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95°F. The mold temperatures should be 115-135° F.

The resin material I36070R has the following description:
 (a) Average molecular weight
   1) Base polyether polyol=500-15,000
   2) Diols=0-10,000
   3) Triols=500-15,000
 (b) Average functionality
   1) total system=1.5-3.2
 (c) Hydroxyl number
   1) total systems=100-300
 (d) Catalysts
   1) amine=Air Products 0.1-3.0 PPH
 (e) Surfactants
   1) total system=0.1-2.0 PPH
 (f) Water
   1) total system=0.2 -0.5%
 (g) Pigments/dyes
   1) total system 1-5% carbon black
 (h) Blowing agent
   1) water.

The I3050U isocyanate description is as follows:
 (a) NCO content—22.4-23.4 wt%
 (b) Viscosity, cps at 25° C. 600-800
 (c) Density=1.21 g/cm$^3$ at 25° C.
 (d) Initial boiling pt.—190° C. at 5mm Hg
 (e) Vapor pressure=0.0002 Hg at 25° C.
 (f) Appearance—colorless liquid
 (g) Flash point (Densky-Martins closed cup)=200° C.

III. Other Materials; Examples of Use

The material for the optional first stage coalescer media 9, would typically be a fibrous media, such as polyester depth media.

Preform structural component for the cartridge 8 can comprise plastic or metal components. Typically plastic components will be preferred. For the inner liner expanded metal is typical. For non-media and non-liner components of the first stage filter coalescer filter 9, typically plastic such as carbon filled nylon are used.

As to the housing, the housing sections are typically molded plastic, for example glass filled nylon. A regulator valve arrangement can be made utilizing a flexible diaphragm and coiled metal spring arrangement, from conventional materials.

IV. Some Alternate Filter Cartridge Configurations, FIGS. 19-26

It is indicated previously, the techniques generally described herein can be implemented in a variety of forms. Some additional examples are shown in the arrangements of FIGS. 19-26.

Figure 19:
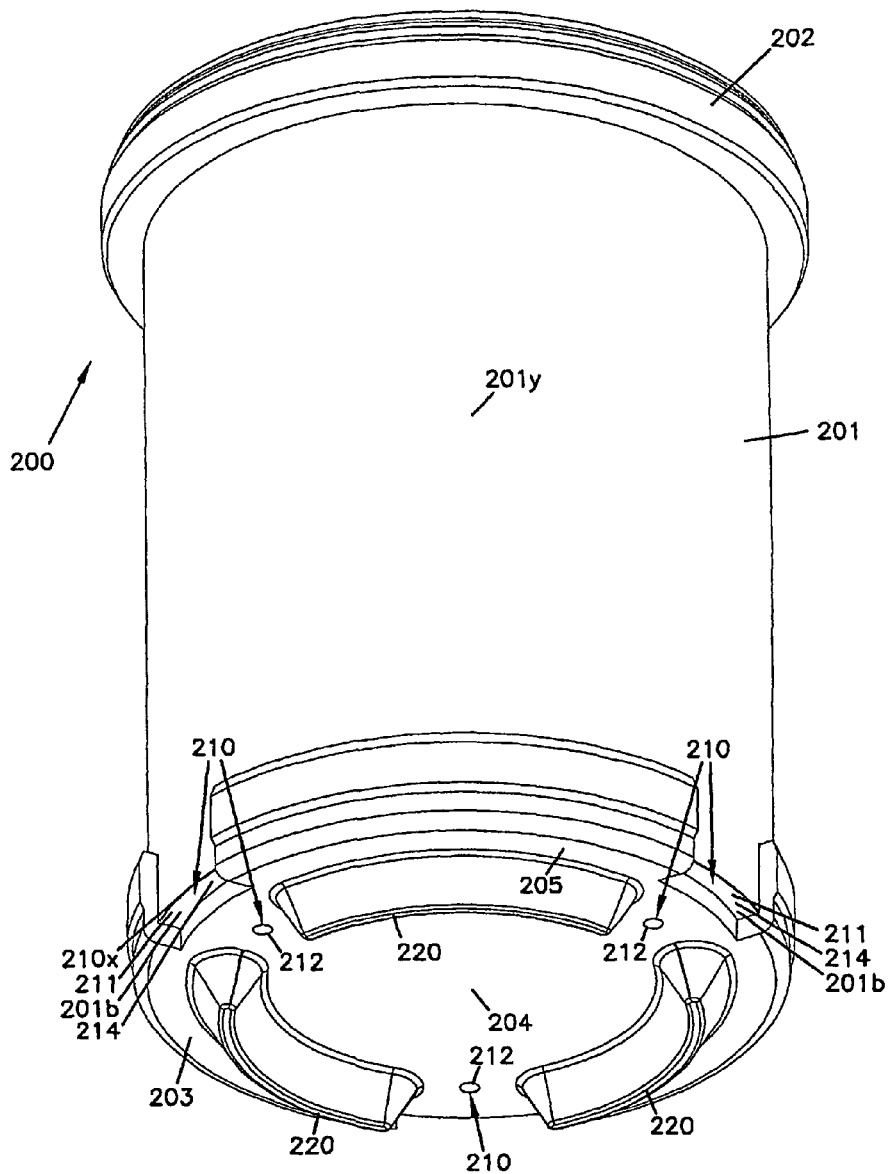
FIG. 19 is a schematic bottom perspective view of an alternate filter cartridge incorporating certain features according to the present disclosure.
Figure 20:
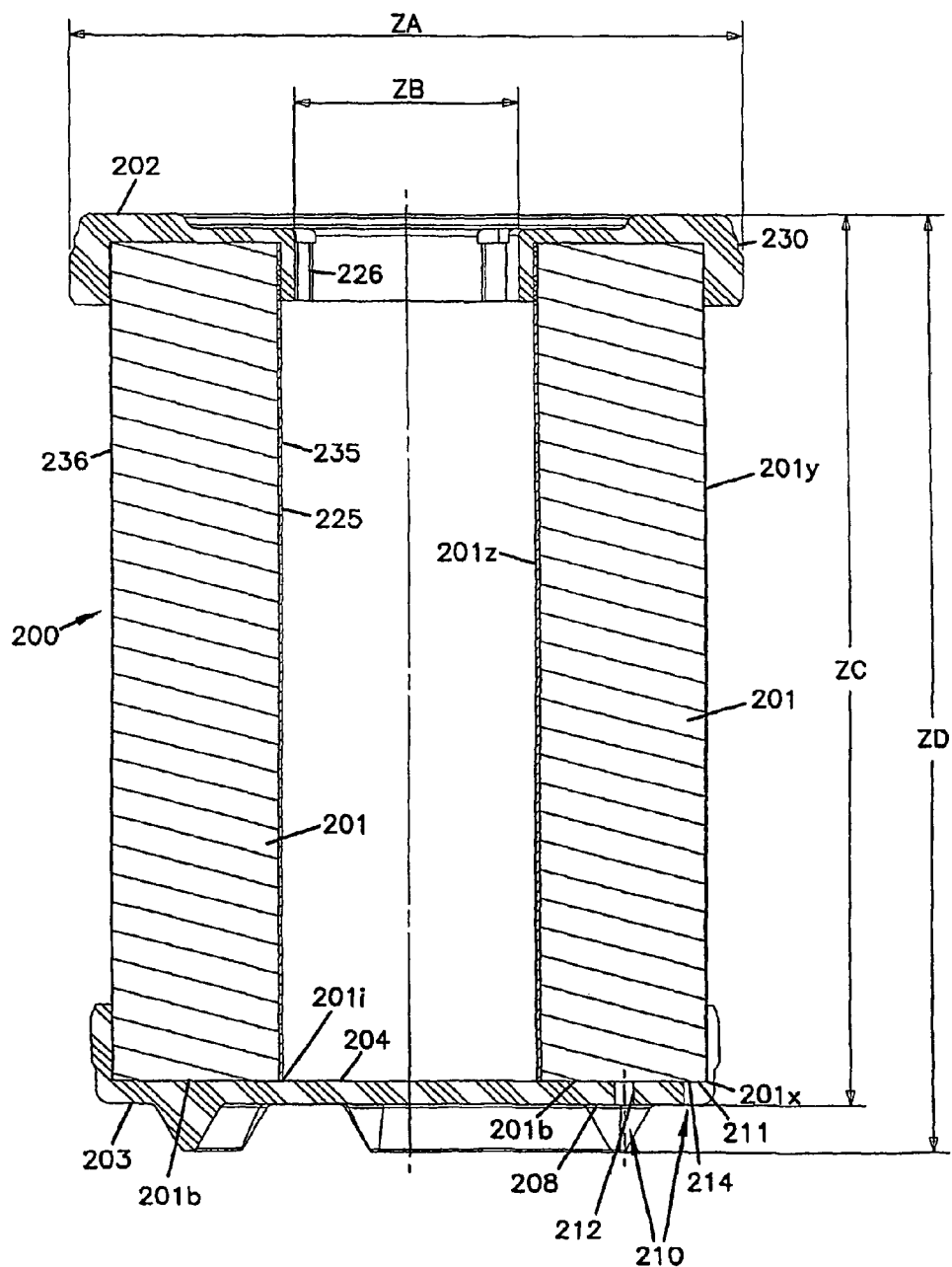
FIG. 20 is a schematic side cross-sectional view of the filter cartridge depicted in FIG. 19.
Figure 21:
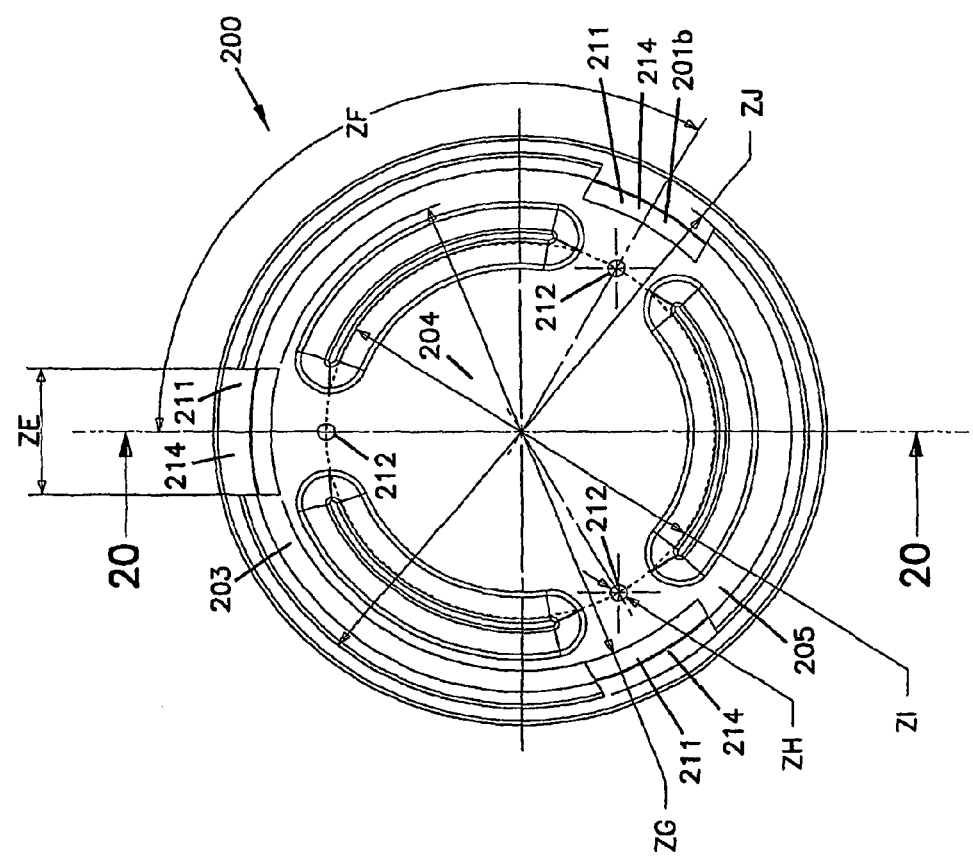
FIG. 21 is a schematic bottom plan view of the cartridge depicted in FIGS. 19 and 20.
Figure 22:
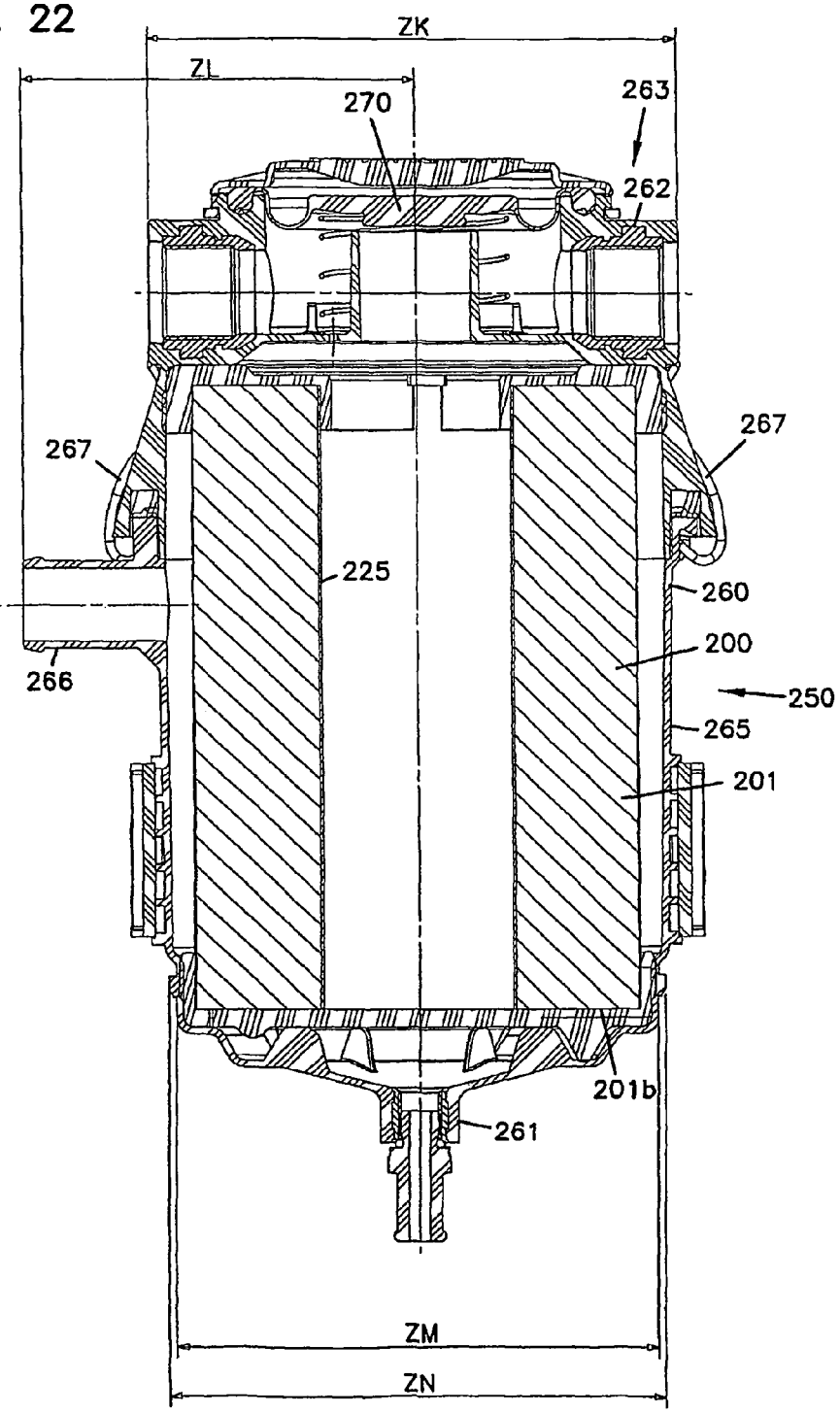
FIG. 22 is a schematic cross-sectional view of the filter assembly including a filter cartridge according FIGS. 19-21, removably positioned therein.

A first alternate example is shown in FIGS. 19-22. FIG. 19 is a bottom perspective view of a cartridge; FIG. 20 is a cross-sectional view of a cartridge; and, FIG. 21 a bottom plan view. In FIG. 22, an assembly including the cartridge is depicted.

Referring to FIG. 19, crankcase ventilation cartridge 200 is depicted. The cartridge 200 is configured to be installed within a crankcase ventilation filter assembly, FIG. 22, during use. The cartridge 200 comprises a media pack 201 and first and second opposite end caps 202 and 203. Tn typical use, end cap 202 would be an upper end cap, and end cap 203 would be a lower end cap.

Still referring to FIG. 19, the cartridge 200 is configured for "in-to-out" flow during filtering. That is, media pack 201 surrounds an open central interior 225, FIG. 20, into which a crankcase ventilation gases are directed. The gas pass outwardly through the media pack 201 to a region surrounding the media, during filtering in use.

Bottom end cap 203 includes a central region 204 which closes a bottom end of an interior region 225, FIG. 20. End cap 203 also includes an outer rim section 205, in axial overlap with a media pack 201. The rim section 205 includes a media overlap axial drain arrangement 210, FIG. 19. The media overlap axial drain arrangement 210 depicted has two windows or drain types: outer rim drain segments 211; and apertures 212. The outer rim sections 211 generally comprise spaced drain windows 214 in the end cap 203, which axially overlap an outer, and lower, edge 201x of the media pack, and extend radially inwardly from the outer lower edge 201x a selected distance. Although alternatives are possible, the distance of media pack overlap inwardly from outer edge 201x will typically be at least 4% of the radial thickness of the media pack 201, usually at least 7%; and, typically not more than 25%, and usually not more than 20%, of this thickness.

The actual dimension of overlap i.e. extension radially inwardly from outer edge 201x, will vary from arrangement to arrangement. However, although alternatives are possible, this dimension will be at least 4 mm, typically 4 mm-20 mm for each drain window 211. The circumferential width of each window 211 shown in FIG. 21 at dimension ZE will typically be at least 15 mm and not more than 45 mm, for example 20-40 mm, although alternatives are possible. The number of drain windows 211 will typically be at least one, often at least two, usually 2-8, although alternatives are possible.

Apertures 212 are also positioned in overlap with the media pack 201. However, each aperture 212 is spaced from the media outer edge 201x, and is typically surround by the material of the end cap 203. The apertures 212 can have a variety of shapes, circular ones being shown. Typical dimensions for the apertures 212 would be for each to have an open area of at least 0.04% and typically at least 0.05% of an area defined by the perimeter of the end cap 203. Typically each aperture 212 comprises 0.04-1% of the perimeter area of end cap 203, although alternatives are possible. The number of apertures 212 may be varied, for the example shown three (3) apertures 212 are depicted. Typically, the number of apertures 212 will be 2 to 8, inclusive.

In terms of the total overlap area with bottom 201b of media pack 201, provided by the axial drain arrangement 210, typically the overlap will be at least 0.5% of this area, not more than 15% of this area, although alternatives are possible.

For the example shown, each aperture 212 has a diameter (if round) of at least 1 mm typically not more than about 8 mm, for example 3-6 mm. In cross-sectional area, typically each aperture has an area of at least 3 square mm, typically at least 5 square mm and often within the range of 5 square mm-70 square mm.

Typically, each aperture 212 is located at least 10% of a distance across media pack 201 from each of the inner and outer edges (201i; 201x) of the media pack 201, typically at least 20% of this distance.

Referring to FIG. 19, end cap 203 includes downwardly projecting projections or bumpers 220, to facilitate secure positioning within housing during use.

Tn FIG. 20 cartridge 200 is depicted in cross section. Window 211 can be seen in axial overlap with a bottom end 201b of media pack 201, to permit drainage. Drain aperture 212 is shown overlapping a central portion of bottom end 201b of media pack 201.

In FIG. 20, media pack 201 can be seen surrounding central open interior 225.

End cap 202 can be seen as including central aperture 226 therein, to permit inlet flow of air to be filtered. End cap 202 is also depicted as including a seal region 230 thereon for sealing for housing during installation. The particular seal region 230 depicted is configured as an outside radial seal. That is, sealing 20 between the end cap 202 and a housing arrangement in use would generally be by compression of region 230 against an annular housing seal surface. Alternative seal types and locations can be used.

The particular cartridge 200 depicted in FIG. 20, does not include a first stage filter analogous to filter 9, FIG. 8 herein. However, such an arrangement could be utilized with the principles of FIG. 20.

Materials utilized for the media 201 can be analogous to those described herein in further embodiments. The material utilized for the end caps 202, 203, comprise a polyurethane material as previously described, if desired.

The media pack 201 can include an inner and/or outer liner for support, as may be desired in some instances. Example liners are indicated in FIG. 20 as inner liner 235 and outer liner 236, respectively. The inner liner 235 and outer liner 236 may each comprise, for example, an expanded metal liner, a porous metal liner, or a plastic (porous) liner.

In FIG. 20, example dimensions are as follows: ZA=140.8 mm; ZB=47.4 mm; ZC=192.7 mm; and, ZD=202.9 mm.

In FIG. 21, bottom plan view, dimensions for an example are indicated as follows: ZE=30 mm; ZF=120°; ZG=114.4 mm diameter; ZH=4 mm diameter; ZI=89.6 mm diameter; ZJ=132.8 mm diameter. For the cartridge of FIGS. 19-21, other dimensions can be determined from scale.

In general, then, referring to FIGS. 19 and 20, the cartridge 200 can be said to have a media pack 201 having opposite flow faces, first, outer, outlet flow face 201y; and, second, inner, inlet flow face 201z. During filtering, gas flow generally goes from the inlet flow face 201z to the outlet flow face 201y. The media 201 also includes a lower, or downwardly directed in use, edge 201b that operates as a drain edge for liquid within the media pack 201. The drain edge 201b extends between the flow faces 201y, 201z. The axial overlap drain arrangement 210 at end cap 203, is generally in overlap with edge 201b.

In FIG. 22, cross-sectional view of a crankcase ventilation filter assembly 250 including cartridge 200 therein as a serviceable (i.e., removable replaceable) part is shown. Referring to FIG. 22, housing 260 is depicted having a bottom drain 261 for collected liquid and an upper, access, cover assembly 262. A gas flow inlet assembly 263 is provided in the access cover arrangement 262 to 20 direct crankcase ventilation gases into cartridge interior 225. The housing 260 includes a base 265 having an air flow outlet 266. Filtered gases can leave housing 260 through outlet 266, after they have passed (with filtering) through media pack 201 in an in-to-out flow.

Still referring to FIG. 22, the cover assembly 262 is shown latched in place by latches 267. The cover assembly 262 can include a regulation valve arrangement 270 therein, to control flow.

In operation, then, assembly 250 provides for a filtering of crankcase ventilation gases. The filter gases leave the assembly 263 through outlet 266. Coalesced liquid from the gases drains downwardly through the axial overlap drain arrangement 210 characterized in connection with FIGS. 19-21, and outwardly from housing 260 via bottom drain 261.

In FIG. 22, example dimensions are provided as follows: ZK=148 mm; ZL=110 mm; ZM=134.3 mm; and, ZN=138.4 mm. Other dimensions can be determined from scale.

Figure 23:
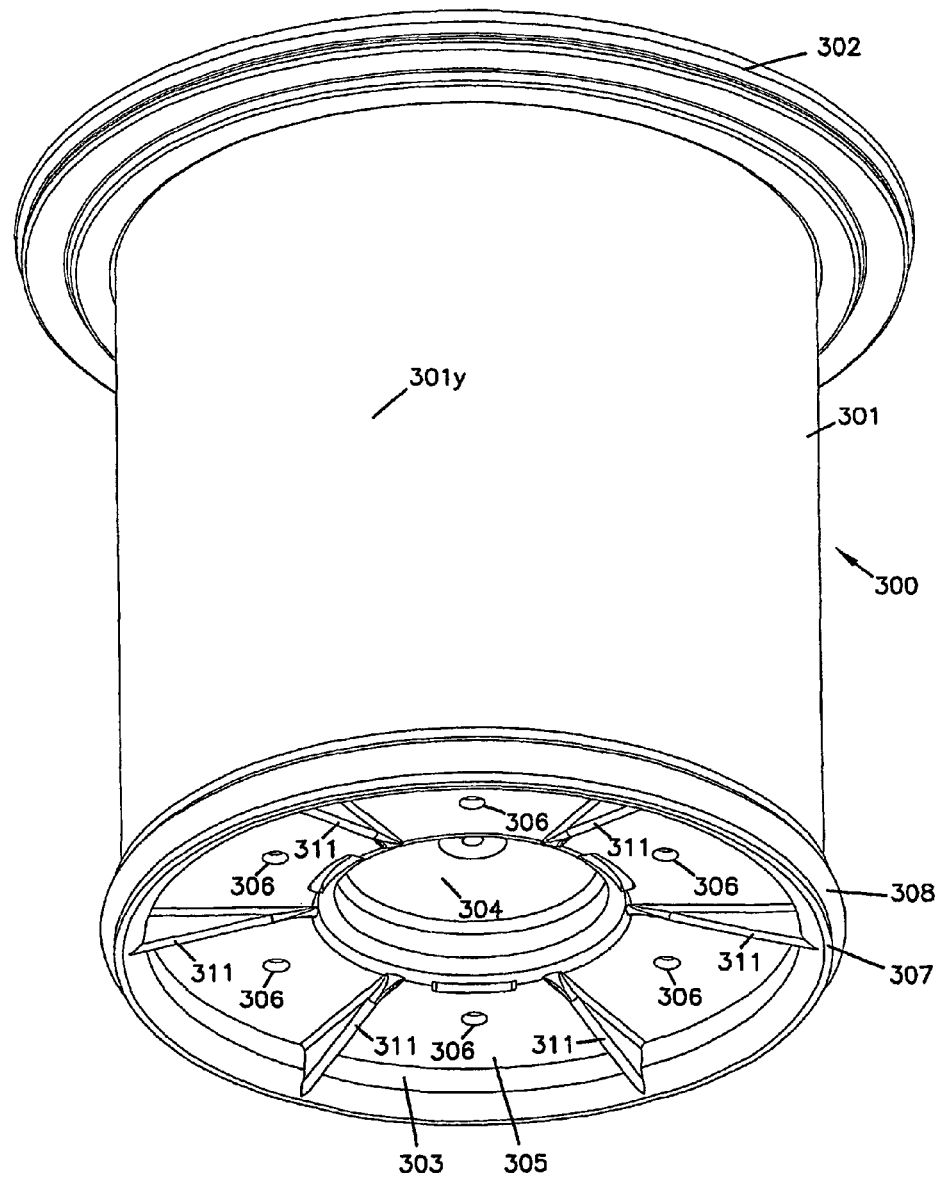
FIG. 23 is a schematic bottom perspective view of a second alternative filter cartridge incorporating features according to the present disclosure.

The second alternate example is illustrated in FIGS. 23-26. Referring to FIG. 23, cartridge 300 comprises media pack 301, first, top, end cap 302, and second, bottom, end cap 303. Cartridge 300 is configured for out-to-in flow during filtering as discussed below.

The bottom end cap 303 includes a closed central region 304 (which closes central open region 320, FIG. 24) and an outer region 305 (in axial overlap with media pack 301) with a drain media axial overlap arrangement in the form of apertures 306 therein. End cap 303 also includes an outer rim 307 with o-ring 308 positioned thereon as a housing seal. Further, downward directed vanes 311 are positioned in overlap with region 305. The vanes 311 are positioned between the apertures 306.

Figure 24:
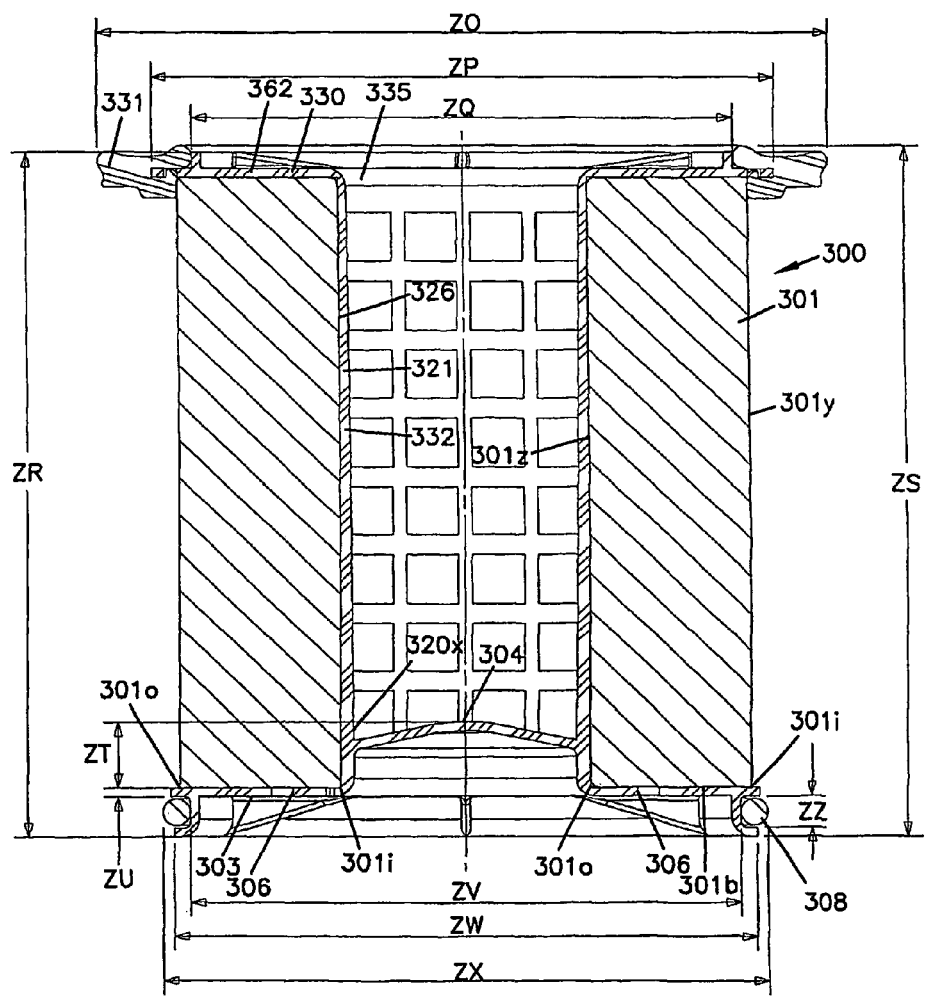
FIG. 24 is a schematic side cross-sectional view of the filter cartridge depicted in FIG. 23.

Referring now to FIG. 24, the media pack 301 surrounds central open region 320 and inner liner 321. The central open region 320 is closed at lower end 320x by central region 304. End cap 302 comprises end piece 330 and outer housing seal member 331. The end piece 330, for the example shown, is integral with inner liner 321. Still referring to FIG. 22, for the example shown end cap 303 is also integral with center liner 320.

Typically, end piece 330, end cap 303 and inner liner 321 comprise integral, molded, piece 332, for example, of a plastic. The piece 332 comprises end piece 330, end cap 303, and liner 321 will sometimes bereferenced herein as a piece or spool 332 around which media pack 301 is positioned.

Seal member 331 is secured to the end piece 330. The housing seal member 331 can be adhered in place, or be molded in place. The seal member 331 is an axial pinch seal configured for engagement between selected housing components, during use.

Still referring to FIG. 24, upper end cap 302 includes a central aperture 335 oriented for air flow of cranlccase ventilation gases after filtering from internal region 320; the cartridge 300 being configured for "out-to-in" flow during filtering.

In use, then, during filtering the gases are directed through the media pack 301 from outside end, and once filtered enter central region 320 by passage through apertures and inner liner 321. The filtered gases can then escape through aperture 335 and be directed where desired by the assembly. Within the media pack 301 coalescing of liquid will occur, with drainage axially downwardly, through axial overlap drain arrangement comprising the apertures 306, FIG. 23.

Seal ring 308 can provide for sealing engagement with housing appropriately sized and configured to receive cartridge 300.

The media pack 301 may generally comprise material analogous to those described herein for other applications. The plastic selected for piece 340, would generally be as appropriate with the structural rigidity and chemical resistance, for the application of use. A useable example for some application is nylon, for example glass fiber reinforced nylon 66. Seal member 331 can comprise a variety of materials selected for the particular application involved. Typically seal material 331 will comprise a materials sufficiently resilient, for the use intended.

The seal member 331 can be configured for a variety of types of sealing. Seal member 331 can be specifically configured to form an outwardly directed seal when inserted in a housing. It can also be specifically configured to be pinched asan axial pinch seal between housing members when installed.

Typically the number of apertures 306 will be at least two and not more than 10. Each aperture will typically be positioned at least 10% of the thickness of the media pack 301 from inner region 301i, and 10% of the thickness of the media pack 301 from outer edge 301o. Usually each aperture 306 is positioned in axial overlap with a region of media pack 301 spaced at least 20% of the thickness of the media pack 301 from each of the inner and outer edges 301i and 301o.

The shape of the apertures 306 is a matter of choice, circular apertures being convenient.

In FIG. 24, example dimensions are provided as follows: ZO=160.2 mm; ZP=136 mm; ZQ=118 mm; ZR=154.9 mm; ZS=156.4 mm; ZT=15 mm; ZU=2 mm;ZV=120 mm;ZW=127 mm;ZX=132 mm;and,ZZ=7 mm.

It is noted that central region 304, then, is raised above a bottom of end cap 303 by about 15 mm (usually at least 10 mm), and is dome shaped with a central higher portion. This helps liquid in interior 320 to drain back into the media 301 and downwardly through the axial overlap drain arrangement defined by apertures 306.

Figure 25:
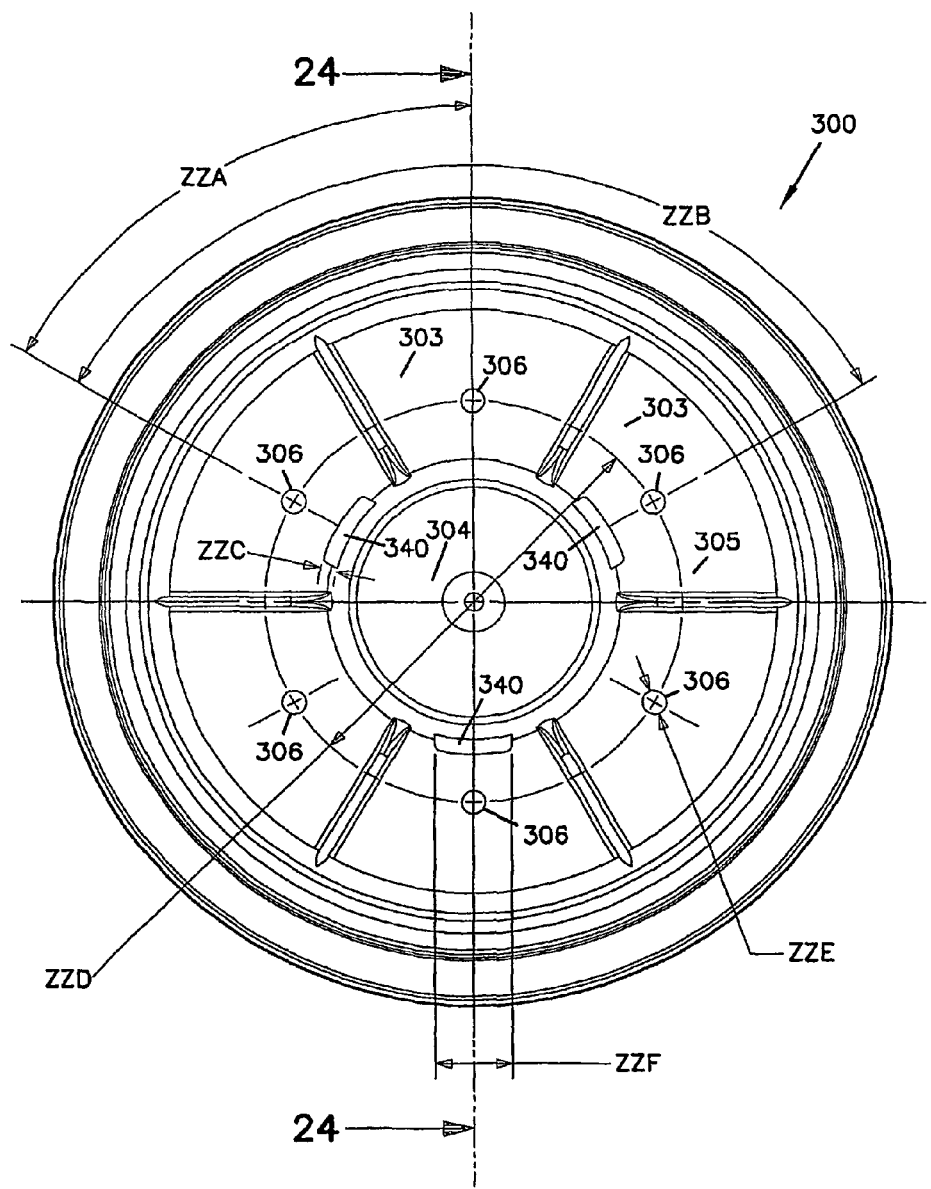
FIG. 25 is a schematic bottom plan view of the filter cartridge depicted is FIGS. 23 and 24.

In FIG. 25, bottom plan view of the cartridge 300, dimension of an example are indicated as follows: ZZA=60°; ZZB=120°; ZZC=3 mm; ZZD=80 mm; ZZE=4.6 mm diameter; and, ZZF=15 mm.

Referring to Fig. 25, the bottom plan view of end cap 303, it is noted that in addition to apertures 306, the axial overlap drain arrangement also includes windows 340 along an inner region of end cap 303, in axial overlap with the media pack 301 along an inner edge 301o, Fig. 24, thereof. The windows 340 further provide for a drain of liquid collected in media pack 301, during use.

Windows 340 may be generally characterized previously for windows 211, except located adjacent an interior edge of the media pack 301. Typically the overlap amount in terms of thickness of the media pack 301 is at least 4%, typically at least 7%, usually not more than 25% and typically not more than 20%.

In a typical example in accord with FIG. 9, typically the total area of overlap of the axial drain arrangement (comprising the apertures 306 plus the windows 340), in terms of the overall area of the bottom end 301b, FIG. 24, of the media pack 301, is at least 0.5% and typically more than 15, although alternatives are possible.

In general terms then, referring to FIGS. 23 and 24, the cartridge 300 includes a media pack 301 having a first, outer, inlet flow face 301y; and, a second, inner, outlet flow face 301z. During filter operation, gases flow from the inlet flow face 301y to the outlet flow face 301z. The media pack 301 also includes a lower, drain, edge or end 301b, extending between the faces 3Oly, 301z. During use, liquid coalescing within the media pack 301 can drain downwardly and outwardly through the end 301b. The axial overlap drain arrangement, as a portion of the end cap 303 that is open, and overlap with end 3O1b.

Because the arrangement is configured for use in a cartridge as described below in connection with Fig. 26, the cartridge 300 includes a housing seal arrangement including two housing seals thereon, pinch seal 331 and outwardly directed o-ring or radial seal 308, on opposite end caps 302, 303 respectively.

Figure 26:
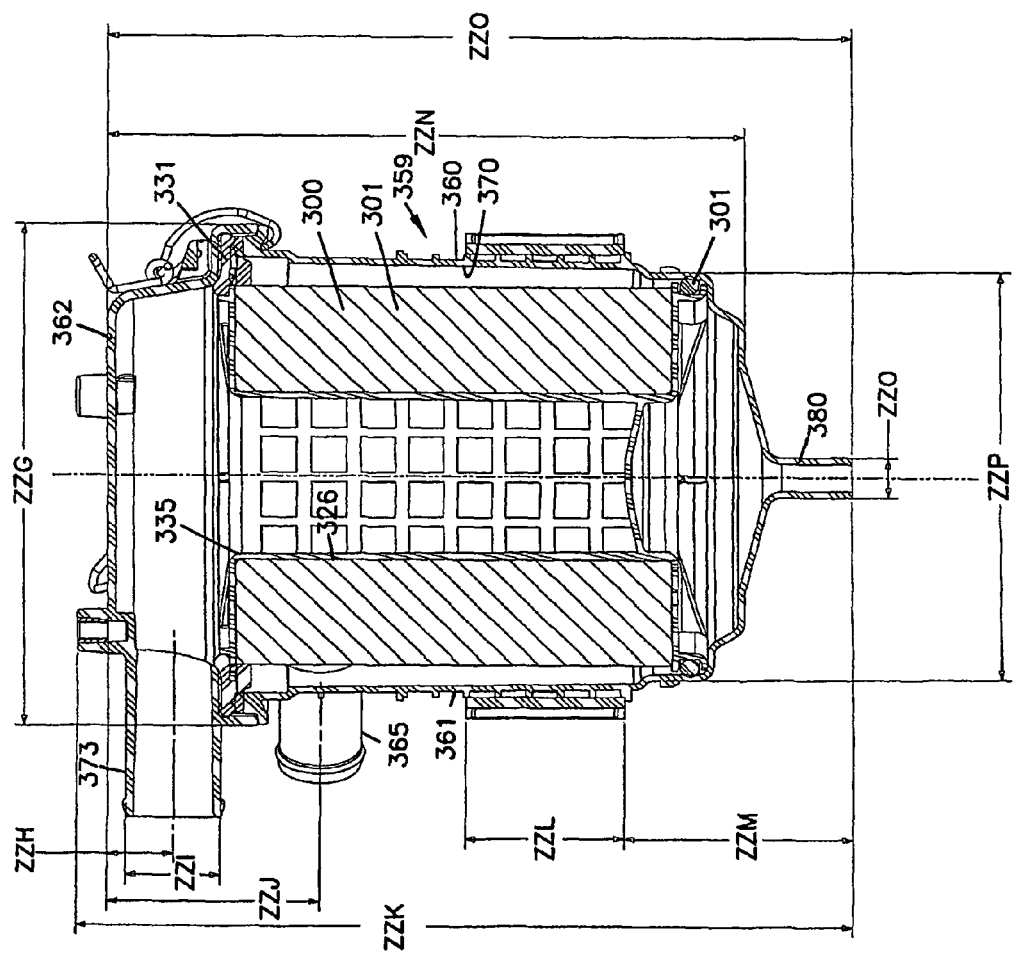
FIG. 26 is a schematic cross-sectional view of a filter assembly including a filter cartridge according to FIGS. 23-25, removably positioned therein.

In FIG. 26, cross-sectional view of a crankcase ventilation filter assembly 359 including cartridge 300 therein as removable and replaceable (i.e., serviceable) component within a housing 360. The housing 360 includes a base 361 and cover assembly 362. A gas flow inlet is indicated in the base 361, at 365. The cartridge 300 is configured for out-to-in flow during filtering. Gas passes into the filter assembly 360 through inlet 365 and into interior arinulus 370. The gas then passes through the media pack 301 into interior 326. It can then pass into cover assembly 362 and out from the housing 360 through outlet 373.

The cartridge 300 in shown sealed to the housing base 361 by lower housing seal member 308 and between the cover assembly 362 and base 361 by housing seal member 331.

In the bottom of assembly 359 is provided drain 380.

In use, then, as the gases from the crankcase, and out-to-in flow fashion, are passed through the media pack 301, liquid which collects can pass downwardly through the axial overlap drain arrangement represented by apertures 306 and windows 340, with liquid drainage outwardly from housing 360 through drain 380. The filtered gases can then pass through aperture 335 into cover assembly 362 and outwardly from housing 360 through outlet 373.

In FIG. 27, example dimensions are as follows: ZZG=165.6 mm; ZZH=20.8 mm; ZZI=30 mm; ZZJ=66.7 mm; ZZK=245.8 mm; ZZL=50.5 mm; ZZM=72.5 mm; ZZN=201.4 mm; ZZO=235.9 mm; ZZO=12.7 mm; and, ZZP=134.4 mm. Other dimensions can be taken from scale in the drawing.

V. Useable Media Formulations and Formation for the Extension of Media 15; 201; 301

As discussed, a variety of media types can be used for the extension of media 15. Typically the extension of media 15 will comprise a continuous fibrous body formed. A typical shape would be cylindrical, although alternatives are possible.

An example media as described in U.S. provisional application 60/656,806 filed Feb. 22, 2005, incorporated herein by reference. Another example media is described in PCT Publication WO 05/083,240, published Sep. 9, 2005, and incorporated herein by reference. A third example media is described in U.S. provisional application 60/650,051 filed Feb. 4, 2005, incorporated herein by reference. The following description is of example media from U.S. provisional application 60/650,05 1, filed Feb. 4, 2005.

The media of US Provisional application 60/650,051, filed Feb. 4, 2005, is a wet laid media is formed in a sheet form using wet laid processing, and is then positioned on/in the filter cartridge. Typically the wet laid media sheet is at least used as a media stage stacked, wrapped or coiled, usually in multiple layers, for example in the tubular form of extension 15 in a serviceable cartridge.

As indicated, multiple layers, from multiple wrappings or coiling, can be used. A gradient can be provided in a media stage, by first applying one or more layers of wet laid media of first type and then applying one or more layers of a media (typically a wet laid media) of a different, second, type. Typically when a gradient is provided, the gradient involves use of two or more media types which are selected for differences in efficiency. This is discussed further below.

Herein, it is important to distinguish between the definition of the media sheet used to form the media stage, and the definitions of the overall media stage itself. Herein the term "wet laid sheet," "media sheet" or variants thereof, is used to refer to the sheet material that is used to form the media extension 15 of a filter, as opposed to the overall definition of the total media extension 15 in the filter. This will be apparent from certain of the following descriptions.

Media extensions 15 of the type of primary concern herein, are at least used for coalescing/drainage, although they typically also have particulate removal function and may comprise a portion of an overall media stage that provides for both coalescing/drainage and desired removal efficiency of solid particulate removal.

Tn the example arrangement described above, an optional first stage coalescer 9 and a media extension 15 were described in the depicted arrangements. Wet laid mdia according to the present descriptions can be utilized in either stage. However typically the described media would be utilized in extension 15 i.e., the media which forms, in the arrangements shown, a tubular media stage 15.

Although alternatives are possible, an example media composition used to form a media extension 15 in a CCV (crankcase ventilation) filter for coalescing/drainage is typically as follows:

1. It is provided in a form having a calculated pore size (X-Y direction) of at least 10 micron, usually at least 12 micron. The pore size is typically no greater than 60 micron, for example within the range of 12-50 micron, typically 15-45 micron.

2. It is formulated to have a DOPE % efficiency (at 10.5 fpm for 0.3 micron particles), within the range of 3-18%, typically 5-15%.

3. It comprises at least 30% by weight, typically at least 40% by weight, often at least 45% by weight and usually within the range of 45-70% by weight, based on total weight of filtermaterial within the sheet, bi-component fiber material in accord with the general description provided herein.

4. It comprises 30 to 70% (typically 30-55%), by weight, based on total weight of fiber material within the sheet, of secondary fiber material having average largest cross-sectional dimensions (average diameters is round) of at least 1 micron, for example within the range of 1 to 20 micron. In some instances it will be 8-15 micron. The average lengths are typically 1 to 20 mm, often 1-10 mm, as defined. This secondary fiber material can be a mix of fibers. Typically polyester andJor glass fibers are used, although alternatives are possible.

5. Typically and preferably the fiber sheet (and resulting media extension) includes no added binder other than the binder material contained within the bi-component fibers. If an added resin or binder is present, preferably it is present at no more than about 7% by weight of the total fiber weight, and more preferably no more than 3% by weight of the total fiber weight.

6. Typically and preferably the media is made to a basis weight of at least 20 lbs. per 3,000 square feet (9 kg/278.7 sq.m.), and typically not more than 120 lbs. per 3,000 square feet (54.5 kg/278.7 sq.m.). Usually it will be selected within the range of 40-100 lbs. per 3,000 sq. ft. (18 kg-45.4 kg/278.7 sq.m).

7. Typically and preferably the media is made to Frazier permeability (feet per minute) of 40-500 feet per minute (12-153 meters/mm.), typically 100 feet per minute (30 meters/mm.). For the basis weights on the order of about 40 lbs/3,000 square feet—100 lbs./3,000 square feet (18-45.4 kg/278.7 sq. meters), typical permeability's would be about 200-400 feet per minute (60-120 meters/mm.).

8. The thickness of the media sheet(s) used to later form the described media extension 15 in the crankcase ventilation filter at 0.125 psi (8.6 milliards) will typically be at least 0.01 inches (0.25 mm) often on the order of about 0.018 inch to 0.06 inch (0.45-1.53 mm); typically 0.018-0.03 inch (0.45 - 0.76 mm) thick.

Media in accord with the general definitions provided herein, including a mix of bi-component fiber and other fiber, can be used as any media stage in a crankcase ventilation filter as generally described above in connection with the figures. Typically and preferably it will be utilized to form the tubular stage, i.e., extension 15. When used in this manner, it will typically be wrapped around a center core of the filter structure, in multiple layers, for example often at least 20 layers, and typically 20-70 layers, although alternatives are possible. Typically the total depth of the wrapping will be about 0.25-2 inches (6-51 mm), usually 0.5-1.5 (12.7-38.1 mm) inches depending on the overall efficiency desired. The overall efficiency can be calculated based upon the number of layers and the efficiency of each layer. For example the efficiency at 10.5 feet per minute (3.2 m/mm) for 0.3 micron DOPE particles for media stage comprising two layers of wet laid media each having an efficiency of 12% would be 22.6%, i.e., 12%+.12×88.

Typically enough media sheets would be used in the final media stage to provide the media stage with overall efficiency measured in this way of at least 85%, typically 90% or greater. In some instances it would be preferred to have the efficiency at 95% or more. In the context the term "final media stage" refers to a stage resulting from wraps or coils of the sheet(s) of the media.

A. The Preferred Calculated Pore Size.

The media extension performs two important functions:

1. It provides for some coalescing and drainage of oil particles carried in the crankcase ventilation gases being filtered; and 2. It provides for selected filtration of other particulates in the gas stream.

In general, if the pore size is too low:

a. Drainage of coalesced oil particles by gravity, downwardly through (and from) the media, can be difficult or slowed, which leads to an increase of re-entrainment of the oil into the gas stream; and b. Unacceptable levels of restriction are provided to the crankcase gas flow through the media.

In general, if the porosity is too high:

a. Oil particles are less likely to collect and coalesce; and b. A large number of layers, and thus media thickness, will be necessary to achieve an acceptable overall level of efficiency for the media pack.

It has been found that for crankcase ventilation filters, a calculated pore size for media used to form media extension 15 within the range of 12 to 50 micron is generally useful. Typically the pore size is within the range of 15 to 45 micron. Often the portion of the media which first receives gas flow with entrained liquid for designs characterized in the drawings, the portion adjacent the inner surface of tubular media construction, through a depth of at least 0.25 inch (6.4 mm), has an average pore size of at least 20 microns. This is because in this region, a larger first percentage of the coalescing/drainage will occur. In outer layers, in which less coalescing drainage occurs, a smaller pore size for more efficient filtering of solid particles, may be desirable in some instances.

The term X-Y pore size and variants thereof when used herein, is meant to refer to the theoretical distance between fibers in a filtration media. X-Y refers to the surface direction versus the Z direction which is the media thickness. The calculation assumes that all the fibers in the media are lined parallel to the surface of the media, equally spaced, and ordered as a square when viewed in cross-section perpendicular to the length of the fibers. The X-Y pore size is a distance between the fiber surfaces on the opposite corners of the square. If the media is composed of fibers of various diameters, the $d^2$ mean of the fiber is used as the diameter. The $d^2$ mean is the square root of the average of the diameters squared.

It has been found, in some instances, that it is useful to have calculated pore sizes on the higher end of the preferred range, typically 30 to 50 micron, when the rndia stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm). A reason for this is that taller filter stages provide for a higher liquid head, during coalescing, which can force coalesced liquid flow, under gravity, downwardly through smaller pores, during drainage. The smaller pores, of course, allow for higher efficiency and fewer layers.

Of course in a typical operation in which the same media stage is being constructed for use in a variety of filter sizes, typically for at least a portion of the wet laid media used for the coalescing/drainage in initial separation, an average pore size of about 30-50 microns will be useful.

B. Solidity

Solidity is the volume fraction of media occupied by the fibers. It is the ratio of the fibers volume per unit mass divided by the media's volume per unit mass.

Typical materials preferred for use in media extension 15 according to the present disclosure, have a percent solidity at 0.125 psi (8.6 milliards) of fewer than 10%, and typically fewer than 8%, for example 6-7%.

C. Thickness

The thickness of media utilized to make media extension 15 according to the present disclosure, is typically measured using a dial comparator such as an Ames #3W (BOCA Meirose MA) equipped with a round pressure foot, one square inch. A total of 2 ounces (56.7 g) of weight is applied across the pressure foot.

Typical media sheets useable to be wrapped or stacked to form media arrangements according to the present disclosure, have a thickness of at least 0.01 inches (0.25 mm) at 0.125 psi (8.6 milliards), up to about 0.06 inches (1.53 mm), again at 0.125 psi (8.6 milliards). Usually, the thickness will be 0.018-0.03 inch (0.44-0.76 mm) under similar conditions.

Compressibility is a comparison of two thickness measurements made using the dial comparator, with compressibility being the relative loss of thickness from a 2 ounce (56.7 g) to a 9 ounce (255.2 g) total weight (0.125 psi-0.5 63 psi or 8.6 milliards - 38.8 milliards). Typical media (at about 40 lbs/3, 000 square feet (18 kg/278.7 sq.m) basis weight) useable in wrappings according to the present disclosure, exhibit a compressibility (percent change from 0.125 psi to 0.563 psi or 8.6 milliards-38.8 milliards) of no greater than 20%, and typically 12-16%.

D. Preferred DOPE Efficiency at 10.5 ft/minute for 0.3 micron particles. The preferred efficiency stated, is desirable for layers or sheets of media to be used to generate crankcase ventilation filters. This requirement indicates that a number of layers of the wet laid media will typically be required, in order to generate an overall desirable efficiency for the media stage of typically at least 85% or often 90% or greater, in some instances 95% or greater.

The reason a relatively low efficiency is provided in any given layer, is that it facilitates coalescing anddrainage and overall function.

In general, DOPE efficiency is a fractional efficiency of a 0.3 micron DOPE particle (dactyl phthalate) challenging the media at 10 fpm. A TSAR model 3160 Bench (TSAR Incorporated, St. Paul, Minnesota) can be used to evaluate this property. Model dispersed particles of DOPE are sized and neutralized prior to challenging the media.

E. Physical Properties of the (Wet Laid) Media

Typical (wet laid) air filtration media accomplishes strength through utilization of added binders. However this comprises the efficiency and permeability, and increases solidity. Thus, as indicated above, the media sheets and stages according to preferred definitions herein typically include no added binders, or if binder is present it is at a level of no greater than 7% of total fiber weight, typically no greater than 3% of total fiber weight.

Four strength properties generally define media grading: stiffness, tensile, resistance to compression and tensile after fold. In general, utilization of bi-component fibers and avoidance of polymeric binders leads to a lower stifiiness with a given or similar resistance to compression and also to good tensile and tensile after fold. Tensile strength after folding is important, for media handling and preparation of filter cartridges of the type used in many crankcase ventilation filters.

Machine direction tensile is the breaking strength of a thin strip of media evaluated in the machine direction (MD). Reference is to Tapir 494. Machine direction tensile after fold is conducted after folding a sample 180° relative to the machine direction. Tensile is a function of test conditions as follows: sample width, 1 inch (25.4mm); sample length, 4 inch gap (101.6 mm); fold—1 inch (25.4 mm) wide sample 18020 over a 0.125 inch (3.2 mm) diameter rod, remove the rod and place a 10 lb. weight (4.54 kg) on the sample for 5 minutes. Evaluate tensile; pull rate—2 inches/minute (50.8 mm/minute).

F. The Media Composition.

1. The Bi-Component Fiber Constituent.

As indicated above, it is preferred that the fiber composition of the media include 30 to 70%, by weight, of hi-component fiber material. A major advantage of using bi-component fibers in the media, is effective utilization of fiber size while maintaining a relatively low solidity. With the bi-component fibers, this can be achieved while still accomplishing a sufficiently high strength media for handling installation in crankcase ventilation filters.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, in forming the wet laid media. Melting of the first polymer component of the bi-component fiber is necessary to allow the bi-component fibers to form a tacky skeletal structure, which upon cooling, captures and binds many of the other fibers, as well as other bi-component fibers.

Although alternatives are possible, typically the bi-component fibers will be formed in a sheath core form, with a sheath comprising the lower melting point polymer and the core forming the higher melting point.

In the sheath-core structure, the low melting point (e.g., about 80 to 205° C.) thermoplastic is typically extruded around a fiber of the higher melting point material (e.g., about 120 to 260° C.). Tn use, the bi-component fibers typically have a average largest cross-sectional dimension (average fiber diameter if round) of about 5 to 50 micrometer often about 10 to 20 micrometer and typically in a fiber form generally have an average length of at least 1 mm, and not greater than 30 mm, usually no more than 20 mm, typically 1-10 mm. By "largest" in this context, reference is meant to the thickest cross-section dimension of the fibers.

Such fibers can be made from a variety of thermoplastic materials including polyolefin's (such as polyethylene's, polypropylenes), polyesters (such as polyethylene terephthalate, polybutylene terephthalate, P CT), nylons including nylon 6, nylon 6,6, nylon 6,12, etc. Any thermoplastic that can have an appropriate melting point can be used in the low melting component of the hi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefinlpolyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bi-component fiber known as 271P available from Dupont. Others fibers include FIT 201, Kuraray N720 and the Nichimen 4080 and similar materials. All of these demonstrate the characteristics of cross-linking the sheath polymer upon completion of first melt. This is important for liquid applications where the application temperature is typically above the sheath melt temp eratiire. If the sheath does not fully crystallize then the sheath polymer will remelt in application and coat or damage downstream equipment and components.

An example of a useable hi-component fiber for forming wet laid media sheets for use in CCV media is Dupont polyester bi-component 271P, typically cut to a length of about 6 mm.

2. The Secondary Fiber Materials.

The bi-component fibers provide a matrix for the crankcase ventilation filter media. The additional fibers or secondary fibers, sufficiently fill the matrix to provide the desirable properties for coalescing and efficiency.

The secondary fibers can be polymeric fibers, glass fibers, metal fibers, ceramic fibers or a mixture of any of these. Typically glass fibers, polymeric fibers or a mixture are used.

Glass fibers useable in filter media of the present invention include glass types known by the designations: A, C, D, B, Zero Boron B, ECR, AR, R, S-2, N, and the like, and generally, any glass that can be made into fibers either by drawing processes used for making reinforcement fibers or spinning processes used for making thermal insulation fibers.

Non-woven media of the invention can contain secondary fibers made from a number of both hydrophilic, hydrophobic, oleophilic, and oleophobic fibers. These fibers cooperate with the glass fiber and the hi-component fiber to form a mechanically stable, but strong, permeable filtration media that can withstand the mechanical stress of the passage of fluid materials and can maintain the loading of particulate during use. Secondary fibers are typically monocomponent fibers with average largest cross-sectional dimension (diameters if round) that can range from about 0.1 on up, typically 1 micron or greater, often 8-15 microns and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and hurst strength the materials in dry and wet conditions. Additionally, the binder fiber can include fibers made from such polymers as polyvinyl chloride, polyvinyl alcohol. Secondary fibers can also include inorganic fibers such as carbonlgraphite fiber, metal fiber, ceramic fiber and combinations thereof.

The secondary thermoplastic fibers include, but are not limited to, polyester fibers, polyamide fibers, polypropylene fibers, copolyetherester fibers, 10 polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulo sic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be used, to obtain certain desired efficiencies and other parameters.

The sheet media of the invention are typically made using papermaking processes. Such wet laid processes are particularly useful and many of the fiber components are designed for aqueous dispersion processing. However, the media of the invention can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. For a commercial scale process, the bi-component mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bi-component mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bi-component web.

The binder in the bi-component fibers is activated by passing the matt through a heating step. The resulting material can then be collected in a large roll if desired.

3. Surface Treatments of the Fibers.

Modification of the surface characters of the fibers, increase in the contact angle, can enhance drainage capability of filtration media and thus the formed elements of the filter (with respect to pressure drop and mass efficiency). A method of modifiing the surface of the fibers is to apply a surface treatment such as a flourochemical or silicone containing material, typically up to 5% by weight of the media.

The surface treatment agent can be applied during manufacture of the fibers, during manufacture of the media or after manufacture of the media post-treatment, or after provision of the media pack. Numerous treatment materials are available such as flourochemicals or silicone containing chemicals that increase contact angle. An example is the DuPont Zonyl flourochemicals, such as #7040 or #8195.

In the following section, examples of materials are used.

4. Example Materials.

(a) Example A.

Example A is a sheet material useable for example, as a media phase in a crankcase ventilation filter, in which the media phase is required to provide for both good coalescing/drainage and also which can be used in layers to provide useable efficiencies of overall filtration. The material will drain well and effectively, for example when used as a tubular media construction having a height of 4 inches-12 inches (100-300.5 mm). The media can be provided in multiple wrappings, to generate such a media pack.

Media example A comprises a wet laid sheet made from a fiber mix as follows: 50% by wt. DuPont polyester bi-component 271P cut to 6 mm length; 40% by wt. DuPont polyester 205 WSD, cut to 6 mm length; and 10% by wt. Owens Corning DS-9501-11W Advantex glass fibers, cut to 6 mm.

The DuPont 271P bi-component fiber has an average fiber diameter of about 14 microns. The DuPont polyester 205 WSD fiber has an average fiber diameter of about 12.4 microns. The Owens Corning DS-9501-1 1W has an average fiber diameter of about 11 microns.

The example A material was made to a basis weight of about 40.4 lbs./3,000 sq.ft. The material had a thickness at 0.125 psi, of 0.027 inches and at 0.563 psi of 0.023 inches. Thus, the total percent change (compressibility) from 0.125 to 0.563 psi, was only 14%. At 1.5 psi, the thickness of the material was 0.021 inches.

The solidity of the material at 0.125 psi was 6.7%. The permeability (frazier) was 392 feet per minute.

The MD fold tensile was 2.6 lbs./inch width. The calculated pore size, X-Y direction, was 43 microns. The DOP efficiency of 10.5 feet per minute per 0.43 micron particles, was 6%.

(b) Example B.

Example B was made from a fiber mixture comprising 50% by weight DuPont polyester bi-component 271P cut to 6 mm length; and 50% by weight Lausch B 50R microfiber glass. The microfiber glass had lengths on the order of about 3-6 mm. Again, the DuPont polyester bi-component 271P had an average diameter of 14 microns. The Lausch B 50R had an average diameter of 1.6 microns and a $d^2$ mean of 2.6 microns.

The sample was made to a basis weight of 38.3 lbs./3,000 square feet. The thickness of the media at 0.125 psi, 0.020 inches and at 0.563 psi was 0.017 inches. Thus the percent changed from 0.125 psi to 0.563 psi was 15%, i.e., 15% compressibility. At 1.5 psi, the sample had a thickness of 0.016 inches.

The solidity of the material measured at 0.125 psi was 6.9%. The permeability of the material was about 204 feet/minute. The machine direction fold tensile was measured at 3.9 lbs/inch width.

The calculated pore size X-Y direction was 18 microns. The DOP efficiency at 10.5 ft/minute for 0.3 micron particles, was 12%.

The Exhibit B material would be effective when used as a layer or a plurality of layers to polish filtering. Because of its higher efficiency, it can be used alone or in multiple layers to generate high efficiency in the media.

This material would be border line as a coalescer/drain material, however, due to the relatively small pore size.

The Exhibit B material, then, could be used to form a downstream portion of the media pack that included a media having a higher pore size upstream, to form a stage for coalescing/drainage.

In a tubular construction, for example, Exhibit A material could be used to form an inside of the tube, with Exhibit B material used to form an outside of the tube, the two together comprising a filtered media stage in a crankcase ventilation filter of desirable drain properties and overall efficiency of filtering.

As indicated, a variety of materials can be utilized for the media and media packs 15, 201, 301, selected for preferred characteristics for the situations described. Useable materials are described in U.S. provisional application Serial No. 60/650,051 filed Feb. 4, 2005 and incorporated herein by reference: as well as in corresponding PCT application PCT/US2006/004639 filed Jan. 31, 2006 and published on Aug. 10, 2006 as WO 2006/084282 the complete disclosure of which is incorporated herein by reference.

Still further examples are described in U.S. patent application Ser. No. 11/267,958 filed Nov. 4, 2005; and U.S. application Ser. No. 11/381,010 filed May 1, 2006, each of which is incorporated wherein by reference.

G. Crankcase Ventilation Filter Constructions Utilizing the Preferred Media

The preferred wet laid media as characterized above, can be utilized in a variety of manners in crankcase ventilation filter arrangements. In the arrangements described in the figures, they can be used for the tubular stage, for example. Such media can also be used in the optional first stage, if desired.

Typically a tubular stage will be made using 20-70 wraps of coiled wet laid media in accord with descriptions above. Of course alternatives are possible.

Because of the good drain characteristics, in some instances it will be possible to avoid the first stage, characterized herein as optional, when the tubular media stage comprises a media of the type characterized herein. The reason is that such media can provide for initially efficient and effective coalescing and drainage, to be useable both as part of the particulate filter stage and as the coalescing/drain stage.

As a result, the media characterized herein can offer a variety of alternate configurations for crankcase ventilation filters. An example would be one in which the media is arranged in a tubular form, for flow therethrough a crankcase ventilation gases. In others the media could be configured in panel arrangements or other arrangements.

In more general terms, a filtration system which manages both coalescing/drainage of our entrained liquid particulates, and also filtration of particles, should be designed to drain thecollected liquids rapidly, otherwise functional life of the filter media would be uneconomically short. The media is positioned so the liquid can drain from the media rapidly. Some key performance properties are: initial and equilibrium fractional efficiency, pressure drop and drainage ability. Some key physical properties of the media are thickness, solidity and strength.

Generally the media for coalescing/drainage is aligned in a manner that enhances the filters capability to drain. For tubular constructions, this would be a media position with the central axis of the tube extending vertically. In this orientation, any given media composition will exhibit an equilibrium load height which is a function of the X-Y pore size, fiber orientation and the interaction of the liquid with the fiber surface, measuredas contact angle. Collection of liquid in the media will increase in height to a point balanced with the drainage rate of the liquid from the media. Of course any portion of the media that is plugged with draining liquid would not be available for filtration, Thus such portions of the media would increase pressure drop and decrease efficiency across the filter. As a result it is advantageous to control the portion of the element that remains with pores plugged by liquid phase. Alternately stated is it is advantageous to increase drainage rate.

The media factors effecting drainage rate are X-Y pore size, fiber orientation and interaction of the liquid being drained with the fiber surface. Reducing these to accomplish a desirable liquid flow is in part the issue. The X-Y pore size being increased, facilitates drainage as explained above.

However this reduces the number of fibers for filtration, thus the overall efficiency of the filter. To achieve target efficiency, relatively thick media pack structure would be made, by using multiple layers of material having a desirable X-Y pore size. Also, the fibers would preferably be oriented with a vertical direction of the media if possible, but this approach is generally difficult to maximize. Typically the media, if provided in a tubular form, would be oriented with the X-Y plane from the wet laid manufacturing process, defining the surface of the tube and with the Z direction being the thickness.

The interaction of the liquid being drained with the surface of the fibers was discussed above. To enhance this, treatment supplied to the fiber surfaces can be used. Treatments discussed above are flourochemicals or silicone containing treatments. If a higher efficiency is desired than would be obtained with a media that is constructed for good drainage, then at an upstream end of the media a more efficient media stage can be provided, typically as part of the same media pack. This is discussed above, in the example providing Example A material as the earlier stage of the media pack in which most coalescing/drainage occurs, and the later material of Exhibit B to provide for a higher efficiency polish.

V. Some General Observations

In general terms, according to the present disclosure crankcase ventilation filter cartridge and techniques useable therein, are provided. In general an extension of media is provided in a form that allows for direct axial drain downwardly at an end of the media, in use. Typically the media is secured within a cartridge, in a manner that allows for the direct axial drain of liquid from the media. This allows drainage with relatively less required accumulation of liquid within the media.

The principles can be applied in a wide variety of filter cartridge sizes and shapes. In general the techniques involve providing a lower drain end to the media pack, that allows for direct axial drainage from the media during operation.

In an example shown and described herein, the techniques are depicted implemented in a filter cartridge of general style described and depicted in U.S. Pat. No. 6,852,148. Of course the techniques can be applied in all cartridges of alternate configurations.

In an example shown, a crankcase ventilation filter cartridge is provided that includes a first extension of media surrounding a media open interior and having a media first end and a media second end. A first end cap is positioned at the media first end. The first end cap defines a flow aperture therethrough in communication with the media open interior. A housing seal arrangement is provided on the cartridge, to seal the cartridge to a housing structural member in use. The media will have media overlap axial drain arrangement positioned at the second end of the first extension of media. The media overlap axial drain arrangement allows for a direct drainage of liquid collected within the media outwardly from the second end of the media. This allows drainage to begin earlier during typical operation.

In some examples shown, the housing seal arrangement is an integrally molded portion of the first end cap and the housing seal arrangement is a radially directed seal, in one instance surrounding and defining the flow aperture. An alternate approach is also described, in which the housing seal arrangement is an axial seal.

In an example shown, the media overlap axial drain arrangement comprises a second end cap positioned at the media second end and having a central closed section extending across the media open interior. In this manner, the second end cap closes the media open interior at the media second end.

The typical second end cap defines spaced drain regions in direct axial overlap with the media second end. By the term "direct axial overlap" in this context, it is meant that some drainage outwardly from the media second end occurs axially, without required passage outwardly from the outer face of the media.

In one example shown, the second end cap comprises spaced extensions that extend from the central closed section of the second end cap across the media second end to a location outside of the media outer perimeter, Typically, when in this form, the second end cap comprises at least two such spaced extensions, typically 3-6 such spaced extensions, although alternatives are possible. An example shown is the second end cap includes four spaced extensions.

In an example described, the spaced extensions each include an axially outwardly directed projection arrangement thereon.

In certain example arrangements, both the first end cap and second end cap are molded-in-place. Typically when this is the case, each is molded from polyurethane foam. (An alternate to this is described.)

As described herein, a filter cartridge is provided with a first stage coalescer filter, as an option, positioned surrounded by the first extension of media and extending radially across the media open interior. The first stage coalescer filter is positioned then such that flow into the open interior of the filter media, through the first end cap, passes through the first stage coalescer.

In an example shown, the first stage coalescer filter comprises a region of fibrous media positioned between an upstream grid and a downstream grid.

In an example described, the first extension of media defines a cylindrical media extension having an outer surface and an inner surface. The first extension of media comprises a fibrous wrap of media coiled around an inner support. A useable media is described herein, with respect to selected properties and components.

Also according to the disclosure a craiilccase ventilation filtration assembly is described which includes a housing defining an interior and including a gas flow inlet arrangement, a gas flow outlet arrangement and a liquid drain outlet arrangement. A serviceable crankcase ventilation filter cartridge, for example according to descriptions herein, is positioned within the housing interior such that during operation normal flow to the housing through the gas flow inlet arrangement is directed through the first extension of media with at least a portion of the coalesced liquid from the first extension of media draining axially therefrom through an axial drain arrangement at a second or lower end of the first extension of media to the liquid drain outlet arrangement of the housing; and, with gas flow from the extension of media directed out of the gas flow outlet arrangement. A variety of example features for a housing and serviceable filter cartridge are described.

What is claimed is:

1. A crankcase ventilation filter cartridge comprising:
 (a) a media pack comprising a first extension of filter media surrounding a filter media open interior and extending between a media first end and a media second end;
  (i) the media having an outer perimeter surface and an inner perimeter surface, each comprising gas flow surfaces;
 (b) a first end piece at the media first end defining a central flow aperture therethrough in communication with the media open interior;

(c) a second end piece at the media second end; the second end piece being positioned in overlap with the second end of the media and defining a media axial overlap drain arrangement in overlap with the first extension of filter media at the media second end;
  (i) the drain arrangement being positioned and configured to define a passage through the second end piece for at least some liquid flow directly downwardly through and from the filter media second end, at a location between the media outer perimeter surface and the media inner perimeter surface, as gases flow through the filter media in a direction between the outer and inner perimeter surfaces during filtering; and,
(d) a housing seal arrangement.

2. A crankcase ventilation filter cartridge according to claim 1 wherein:
  (a) the housing seal arrangement includes an integrally molded portion of the first end cap.

3. A crankcase ventilation filter cartridge according to claim 1 wherein:
  (a) the housing seal arrangement includes a radially directed seal.

4. A crankcase ventilation filter cartridge according to claim 1 wherein:
  (a) the housing seal arrangement includes an axial pinch seal flange positioned on the first end cap.

5. A crankcase ventilation filter cartridge according to claim 1 wherein:
  (a) the second end piece positioned at the filter media second end has a central closed section extending across the filter media open interior.

6. A crankcase ventilation filter cartridge according to claim 5 wherein:
  (a) the second end piece defines a plurality of spaced passages through the second end piece in direct axial overlap with the filter media second end.

7. A crankcase ventilation cartridge according to claim 6 wherein:
  (a) the second end piece includes a housing seal member thereon.

8. A crankcase ventilation filter cartridge according to claim 6 wherein:
  (a) the plurality of spaced passages includes spaced apertures surrounded by material of the second end piece.

9. A crankcase ventilation filter cartridge according to claim 6 wherein:
  (a) the plurality of spaced passages includes spaced windows in overlap with at least one of an inner edge and an outer edge of the first extension of filter media.

10. A crankcase ventilation filter cartridge according to claim 9 wherein:
  (a) the second end piece includes extensions that extend from a central closed section of the second end piece across the media second end to a location at the outer perimeter of the filter media.

11. A crankcase ventilation filter cartridge according to claim 9 wherein:
  (a) the second end piece comprises at least three spaced windows.

12. A crankcase ventilation filter cartridge according to claim 10 wherein:
  (a) each one of the spaced extensions includes an axially, outwardly directed, projection arrangement thereon.

13. A crankcase ventilation filter cartridge according to claim 5 wherein:
  (a) the first end piece is a molded-in-place end cap; and
  (b) the second end piece is a molded-in-place end cap.

14. A crankcase ventilation filter cartridge according to claim 13 wherein:
  (a) the first and second end pieces are each polyurethane foam.

15. A crankcase ventilation filter cartridge according to claim 1 including:
  (a) a first stage coalescer filter in a position surrounded by the first extension of filter media and extending radially across the open interior surrounded by the first extension filter media.

16. A crankcase ventilation filter cartridge according to claim 15 wherein:
  (a) the first stage coalescer filter comprises a region of fibrous media positioned between an upstream grid and a downstream grid; and,
  (b) the first stage coalescer filter is positioned such that flow through the first end piece flow aperture into the open interior surrounded by the first extension of filter media must pass through the first stage coalescer filter before passing into the first extension of media surrounding a media open interior.

17. A crankcase ventilation filter according to claim 16 wherein:
  (a) the first extension of filter media is positioned around an inner liner having an inwardly directed bead; and,
  (b) the first stage coalescer filter includes an outer sidewall positioned on the bead.

18. A crankcase ventilation filter cartridge according to claim 1 wherein:
  (a) the first extension of filter media comprises a fibrous wrap of media coiled around an inner media support.

19. A crankcase ventilation filter cartridge according to claim 1 wherein:
  (a) the first extension of filter media comprises a media stage comprising:
    (i) at least 30% by weight, based on total weight of fiber material in the stage, bi-component fiber material having an average largest fiber cross-sectional dimension of at least 10 microns and average length of 1-20 mm, inclusive; and
    (ii) at least 30% by weight, based on total weight of fiber material in the stage, secondary fiber material having an average largest fiber cross-sectional dimension of at least 1 micron and average length of 1 to 20 mm, inclusive; and
    (iii) the first extension of media having:
      (A) a calculated pore size, X-Y direction, of 12 to 50 microns, inclusive; and
      (B) an added binder resin content, if any, of no greater than 7% by total weight of fiber material.

20. A crankcase ventilation filtration assembly comprising:
  (a) a housing defining an interior and including a gas flow inlet arrangement, a gas flow outlet arrangement and a liquid drain outlet arrangement; and
  (b) a serviceable crankcase ventilation filter cartridge comprising:
    (i) a media pack comprising a first extension of filter media surrounding a filter media open interior and extending between a media first end and a media second end;
      (A) the media having an outer perimeter surface and an inner perimeter surface, each comprising gas flow surfaces;
    (ii) a first end piece at the media first end defining a central flow aperture therethrough in communication with the media open interior;
    (iii) a second end piece at the media second end; the second end piece being positioned in overlap with the second end of the media and defining a media axial overlap drain arrangement in overlap with the first extension of filter media at the media second end;
- (A) the drain arrangement being positioned and configured to define a passage through the second end piece for at least some liquid flow directly downwardly through and from the filter media second end, at a location between the media outer perimeter surface and the media inner perimeter surface, as gases flow through the filter media in a direction between the outer and inner perimeter surfaces during filtering; and,
- (iv) a housing seal arrangement; and,
- (c) the crankcase ventilation filter cartridge being positioned within the housing interior such that during operation normal gas flow is through the first extension of media, with at least a portion of coalesced liquid from the first extension of media draining axially therefrom through the axial drain arrangement at an end of the first extension of media to the liquid outlet arrangement; and, with gas flow from the extension of media directed out the gas flow outlet arrangement.

21. A method of filtering crankcase ventilation gases including a step of:
- (a) passing the gases through a first extension of filter media in a crankcase ventilation filter cartridge comprising:
  - (i) a media pack comprising a first extension of filter media surrounding a filter media open interior and extending between a media first end and a media second end;
    - (A) the media having an outer perimeter surface and an inner perimeter surface, each comprising gas flow surfaces;
  - (ii) a first end piece at the media first end defining a central flow aperture therethrough in communication with the media open interior;
  - (iii) a second end piece at the media second end; the second end piece being positioned in overlap with the second end of the media and defining a media axial overlap drain arrangement in overlap with the first extension of filter media at the media second end;
    - (A) the drain arrangement being positioned and configured to define a passage through the second end piece for at least some liquid flow directly downwardly through and from the filter media second end, at a location between the media outer perimeter surface and the media inner perimeter surface, as gases flow through the filter media in a direction between the outer and inner perimeter surfaces during filtering; and,
  - (iv) a housing seal arrangement; and,
- (b) draining at least a portion of liquid collected in the first extension of filter media directly downwardly from inside the media through a bottom end of the media.

* * * * *